United States Patent
Schimek et al.

(10) Patent No.: US 7,799,311 B2
(45) Date of Patent: Sep. 21, 2010

(54) PROCESSES FOR PRODUCING SYNTHETIC PYRITE

(75) Inventors: George L. Schimek, Seven Hills, OH (US); Michael W. Wemple, Westlake, OH (US); Jarod J. LeClaire, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 12/236,857

(22) Filed: Sep. 24, 2008

(65) Prior Publication Data

US 2009/0087374 A1 Apr. 2, 2009

Related U.S. Application Data

(60) Provisional application No. 60/975,973, filed on Sep. 28, 2007.

(51) Int. Cl.
*C01G 9/08* (2006.01)
*C01G 11/02* (2006.01)
*C01G 13/00* (2006.01)

(52) U.S. Cl. .................. 423/561.1; 423/511; 423/565; 423/592.1

(58) Field of Classification Search .................. 423/511, 423/561.1, 565, 592.1; 977/773, 775, 777; 427/217, 255.22, 124, 212, 255.19, 255.28; 22/48; 429/209, 210
See application file for complete search history.

(56) References Cited

U.S. PATENT DOCUMENTS

| | | | |
|---|---|---|---|
| 4,379,815 A | 4/1983 | Bubnick | |
| 4,787,125 A * | 11/1988 | Pinsky et al. | .................. 29/2 |
| 5,151,262 A | 9/1992 | Pemsler et al. | |
| 5,290,414 A | 3/1994 | Marple | |
| 5,514,491 A | 5/1996 | Webber | |
| 5,667,911 A | 9/1997 | Yu et al. | |

(Continued)

FOREIGN PATENT DOCUMENTS

CN 1843941 A 10/2006

(Continued)

OTHER PUBLICATIONS

Tamura et al. "Preparation of iron disulfide and its use for lithium batteries" published in Electrochimica Acta, vol. 28, No. 3, p. 269-275, 1983.*

(Continued)

*Primary Examiner*—Jerry Lorengo
*Assistant Examiner*—Heng M Chan
(74) *Attorney, Agent, or Firm*—Robert C. Baraona

(57) ABSTRACT

Process of making high purity, synthetic $FeS_2$, and an electrochemical battery employing such synthetic $FeS_2$ in the positive electrode. Synthetic $FeS_2$ may be prepared by a sulfidation process comprising reacting ferric oxide, hydrogen sulfide, and elemental sulfur at a temperature above the melting point of element sulfur. Synthetic $FeS_2$ may also be produced by a milling process that comprises (i) milling iron powder and sulfur powder in the presence of a milling media and a processing agent to provide a homogenous powder mixture, and (ii) treating the powder mixture to form $FeS_2$. In the milling process, the powder mixture may be treated to form $FeS_2$ by heating the powder mixture or subjecting the powder mixture to a subsequent milling operation.

23 Claims, 13 Drawing Sheets

U.S. PATENT DOCUMENTS

| | | | |
|---|---|---|---|
| 5,952,120 | A | 9/1999 | Yu et al. |
| 6,056,935 | A | 5/2000 | Kai et al. |
| 6,368,742 | B2 | 4/2002 | Fisher et al. |
| 6,602,593 | B1 | 8/2003 | Callahan et al. |
| 6,926,997 | B2 | 8/2005 | Guidotti et al. |
| 7,491,469 | B2 | 2/2009 | Guidotti et al. |
| 2003/0131908 | A1* | 7/2003 | Misra et al. ............... 148/270 |
| 2006/0239882 | A1 | 10/2006 | Seo et al. |

FOREIGN PATENT DOCUMENTS

| | | |
|---|---|---|
| CN | 1911787 A | 2/2007 |
| DE | 894842 C | 7/1949 |
| WO | 8202347 A1 | 7/1982 |
| WO | WO 2004073021 A2 * | 8/2004 |
| WO | 2005011029 A1 | 2/2005 |

OTHER PUBLICATIONS

Roberts et al. "The chemistry of pyrite formation in aqueous solution and its relation to the depositional environment" published in Mineral. Deposita (Berl.) 4, p. 18-29, 1969.*

Alfa Aesar Research Chemicals, Metals and Materials Catalog 2003-2004. p. 697.*

Meester et al. "Phase controlled low-pressure chemical vapor deposition of iron(di)sulfide" published in J. Phys. IV France 9 (1999) Pr8-425-430.*

Richerson. Modern Ceramic Engineering Properties, Processing, and Use in Design, 2nd edition. Marcel Dekker, Inc. USA: 1992. p. 519-522.*

"Mechanisams of pyrite and marcasite formation from solution: III. Hydrothermal processes" published in Geochimica et Cosmochimica Acta vol. 55, pp. 3491-3504 by Schoonen et al.*

Y.H. Liu, L. Meng and L. Zhang. Thin Solid Films, "Optical and Electrical properties of FeS2 thin films with different thickness prepared by sulfurizing evaporated iron." vol. 479 (2005), pp. 83-88.

B. Ouertani, J. Ouerfelli, M. Saadoun, B. Bessais, H. Ezzauoia and J.C. Bernede. Materials Characterization, "Characterization of FeS2-pyrite thin films synthesized by sulphuration of amorphous iron oxide films pre-deposited by spray pyrolysis." vol. 54 (2005), pp. 431-437.

G. Zahuranec and G. Simkovich. Fuel, "Inert-marker studies during high-temperature formation of FeS2 from FeS1+x." vol. 57 (Dec. 1978), pp. 787-788.

L. Meng, W. Xu, Y. Yang and M. Liu. Jinshu Rechuli, "Synthesizing Pyrite Thin Films by Sulpherizing." vol. 3 (1999), pp. 9-12. (abstract).

J. Xu, Y. Zheng, Y. Sun, J. Li and R. Wu, Gongneng Cailiao, "The preparation and refinement of iron pyrite." vol. 35 (2004), pp. 660-664. (abstract).

X. Wu, Z. Weng, M. Zheng, N. Zhong and S. Cheng. Yangzhou Daxue Xuebao, Ziran Kexueban, "The effect of sulfidation temperature on the structure and composition of pyrite thin films prepared by two-step method." vol. 9 (2006), pp. 39-42. (abstract).

H. Zhang, B.Y. Wang, R.G. Zhang, Z. Zhang, H.J. Qian, R. Su, R.X. Kui and L. Wei. Wuli Xuebao, "Experimental studies on the electronic structure of pyrite FeS2 films prepared by thermally sulfurizing iron films." vol. 55 (2006), pp. 2482-2487. (abstract).

R. Wu, Y.F. Zheng, X.G. Zhang, Y.F. Sun and J.B. Xu. Wuji Cailiao Xuebao, "Hydrothermal synthesis of nanocrystal FeS2 by the seed-induced method." vol. 19 (2004), pp. 917-920. (abstract).

J. Zang, G. Zhao, P. Wang, and G. Han. Guisuanyan Xuebao, "Preparation for pyrite by solvothermal method." vol. 33 (2005), pp. 1075-1080. (abstract).

R. Wu, Y.F. Zheng, X.G. Zhang, Y.F. Sun, J.B. Xu and H.T. Jiang. Xinjiang Daxue Xuebao, Ziran Kexueban, "Preparation of pyrite powder by hydrothermal process." vol. 22 (2005), pp. 134-138. (abstract).

B.I. Erokhin, I.M. Nelen, I.N. Groznov, V.A. Morozov and A.I. Slayskaya. Tsvetnye Metally, "Secondary Sulfide formation in disintegration of pyrrhotite concentrate autoclaving intermediate products." vol. 1 (1983), pp. 13-16.

L. Hou, Y.H. Liu and L. Meng. Gongneng Cailiao, "On the pyrite (FeS2) thin films prepared by sulfurizing the electrodeposited precursive films at different sulfur vapor pressure." vol. 36 (2005), pp. 1251-1253.

N. Saito, S. Nakashima and H. Hayashi. Rep. Res. Inst. Natural Resources, Mining College, "Experimental formation of pyrite from amorphous iron sulfide at 120 C." vol. 60 (Mar. 1995), pp. 1-10.

I. Sunagawa, Y. Endo and N. Nakai. Soc. Mining Geol. Japan, "Hydrothermal Synthesis of Framboidal Pyrite." Issue 2 (1971), pp. 10-14.

A.M. Masalovich. Geologiya Rudnykh Mestorozhdenii, "Transport of matter in the deposition of pyrite in hydrothermal systems." vol. 17 (1975), pp. 59-69. (abstract).

F. Kh. Urakaev, V.S. Shevchenko, T.A. Ketegenov. Izvestiya Natsional'noi Akademii Nauk Respubliki Kazakhstan, Seriya Khimicheskaya, "Novel mechanochemical method for preparation of pyrite." vol. 2 (2003), pp. 114-118. (abstract).

L. Cambi and M. Elli. Chimica e l'Industria, "Hydrothermal processes. IX. Synthesis of sulfides and thiosalts of trivalent metals." vol. 48 (1966), pp. 944-951. (abstract).

D.D. Babic. Nueus Jahrbuch fuer Mineralogie, Monatshefte, "Some aspects on the hydrothermal crystallization of FeS2 (pyrite)." vol. 12 (1982), pp. 551-557.

J.J. LeClaire, E.A. Laitila and D.E. Mikkola. Scripta Materialia, "Forming nanostructured cubic trialuminide/carbide composites by mechanical milling followed by thermal processing." vol. 50 (2004), pp. 95-98.

J.Z. Jiang, R.K. Larsen, R. Lin, S. Morup, I. Chorkendorff, K. Nielsen, K. Hansen and K. West. Journal of Solid State Chemistry, "Mechanochemical synthesis of Fe-S Materials." vol. 138 (1998), pp. 114-125.

J.-h Liu, X.-w. He, J.-f. Yang, D. Wang and S.-q. Liu. Chinese Journal of Power Sources, "Study on new type of Li-FeS2 Battery." vol. 28 (Dec. 2004), pp. 755-758.

S. Kar, S.K. Mandal, D. Das and S. Chaudhuri. Materials Letters, "Wet Chemical Synthesis of Iron Pyrite and Characterization by Mossbauer spectroscopy." vol. 58 (2004), pp. 2886-2889.

R.A. Guidotti, F.W. Reinhardt, J. Dai and D.E. Reisner. Mat. Res. Soc. Symp. Proc., "Preparation and Characterization of Nanostructured FeS2 and CoS2 for High-Temperature Batteries.", vol. 730 (2002), pp. 207-212.

J.P. Pemsler, R.K.F. Lam J.K. Litchfield, S. Dallek, B.F. Larrick, and B.C. Beard. Journal of the Electrochemical Society, "Discharge Behavior and Thermal Stability of Synthetic FeS2 Cathode Material." vol. 137 (1990), pp. 1-7.

M.A.A. Schoonen and H.L. Barnes. Geochimica et Cosmochimica, "Reactions forming pyrite and marcasite from solution: II. Via FeS precursors below 100 C." vol. 55 (1991), pp. 1505-1513.

M.A.A. Schoonen and H.L. Barnes. Geochimica et Cosmochimica, "Reactions forming pyrite and marcasite from solution: I. Nucleation of FeS2 below 100 C." vol. 55 (1991), pp. 1495-1504.

M.A.A. Schoonen and H.L. Barnes. Geochimica et Cosmochimica, "Mechanisms of pyrite and marcasite formation from solution: III. Hydrothermal processes." vol. 55 (1991), pp. 3491-3504.

D.T. Rickard. American Journal of Science, "Kinetics and mechanism of pyrite formation at low temperatures." vol. 275 (Jun. 1975), pp. 636-652.

D. Rickard. Geochimica et Cosmochimica Acta, "Kinetics of pyrite formation by the H2S oxidation of iron (II) monosulfide in aqueous solutions between 25 and 125 C: The rate equation." vol. 61 (1997), pp. 115-134.

D. Rickard and G.W. Luther III. Geochimica et Cosmochimica Acta, "Kinetics of pyrite formation by the H2S oxidation of iron (II) monosulfide in aqueous solutions between 25 and 125 C: The mechanism." vol. 61 (1997), pp. 135-147.

G.W. Luther III. Geochimica et Cosmochimica Acta, "Pyrite Synthesis via Polysulfide Compounds." vol. 55 (1991), pp. 2839-2849.

D. He, Z. Yu-Feng, Z. Xiao-Gang, S. Yan-Fei, D. You-Zhong. Acta Physica Sinica, "Hydrothermal Synthesis of Iron Pyrite (FeS2) Crystal Powder and Thermal-Kinetic Study on Crystal Growth." vol. 54 (Apr. 2005), pp. 1659-1664.

J.-T. Han, Y.-H Huang, and W. Huang. Materials Letters, "Solvothermal synthesis and magnetic properties of pyrite Co1-xFeS2 with various morphologies." vol. 60 (2006), pp. 1805-1808.

R. Wu, Y.F. Zheng, X.G. Zhang, Y.F. Sun, J.B. Xu, and J.K. Jian. Journal of Crystal Growth, "Hydrothermal synthesis and crystal structure of pyrite." vol. 266 (2004), pp. 523-527.

H. Duan, Y.F. Zheng, Y.Z. Dong, X.G. Zhang, Y.F. Sun. Materials Research Bulletin, "Pyrite (FeS2) films prepared via sol-gel hydrothermal method combined with electrophoretic deposition (EPD)." vol. 39 (2004), pp. 1861-1868.

Y.H. Chen, Y.F. Zheng, X.G. Zhang, Y.F. Sun, Y.Z. Dong. Acta Phys.-Chim. Sin., "Effect of pH Value on FeS2 powder synthesized by solvothermal process." vol. 21 (Apr. 2005), pp. 419-424.

X. Chen and R. Fan. Chem. Mater., "Low-Temperature Hydrothermal Synthesis of Transition Metal Dichalcogenides." vol. 13 (2001), pp. 802-805.

S. Kar and S. Chaudhuri. Materials Letters, "Synthesis of highly oriented iron sulfide nanowires through solvothermal process." vol. 59 (2005), pp. 289-292.

X. Chen, Z. Wang, X. Wang, J. Wan, J. Liu and Y. Qian. Inorganic Chemistry, "Single-Source Approach to Cubic FeS2 Crystallites and their optical and electrochemical properties." vol. 44 (2005), pp. 951-954.

Q. Xuefeng, X. Yi and Q. Yitai. Materials Letters, "Solventothermal synthesis and morphological control of nanocrystalline FeS2." vol. 48 (2001), pp. 109-111.

Y. Chen, Y, Zheng, X. Zhang, Y. Sun and Y. Dong. Science in China, Ser. G Physics, Mechanics and Astronomy, "Solvothermal synthesis of nanocrystalline FeS2.", vol. 48 (2005), pp. 188-200.

H. Shimazaki and L.A. Clark. Canadian Mineralogist, "Synthetic FeS2-CuS2 Solid Solution and Fukuchilite-like Minerals." vol. 10 (1970), pp. 648-664.

X.F. Qian, X.M. Zhang, C. Wang, Y. Xie, W.Z. Wang and Y.T. Qian. Materials Science and Engineering, "The preparation and phase transition of nanocrystalline iron sulfides via toluene-thermal process." vol. B64 (1999), pp. 170-173.

A. Gomes, M.I. da Silva Pereira, M.H. Mendonca and F.M. Costa. Solid State Sciences, "Effect of the substrate on the electrodeposition of iron sulphides." vol. 4 (2002), pp. 1083-1088.

A. Gomes, J.R. Ares, I.J. Ferrer, M.I. da Silva Pereira and C. Sanchez. Materials Research Bulletin, "Formation of n-type pyrite films from electrodeposited iron sulfides: effect of annealing temperature." vol. 38 (2003), 1123-1133.

Y.Z. Z Dong, Y.F. Zheng, H. Duan, Y.F. Sun and Y.H. Chen. Materials Letters, "Formation of pyrite (FeS2) thin nano-films by thermal-sulfurating electrodeposition films at different temperature." vol. 59 (2005), pp. 2398-2402.

D. Wan, Y.Y Wang, Z. Zhou, G. Yang, B. Wang and L. Wei. Materials Science and Engineering, "Fabrication of the ordered FeS2 (pyrite) nanowire arrays in aluminum oxide." vol. B122 (2005), pp. 156-159.

E.M. Shembel, R.D. Apostolova, V.M. Nagirnyi, A.S. Baskevich and P.M. Litvin. Russian Journal of Electrochemistry, "Electrolytic Iron Sulfide Products in Lithium Batteries." vol. 40 (2004), pp. 736-742.

J. Luck, A. Hartmann and S. Fiechter. Fresenius Z Anal. Chem., "Stoichiometry and impurity concentration in synthetically grown iron pyrite crystals and their constituents." vol. 334 (1989), pp. 441-446.

N. Takahashi, Y. Nakatani, T. Yatomi and T. Nakamura. Chemistry of Materials, "Growth of Single-Crystal Pyrite Films by Atmospheric Pressure Chemical Vapor Deposition." vol. 15 (2002), pp. 1763-1765.

N. Takahashi, T. Yatomi and T. Nakamura. Solid State Sciences, "Crystal Quality, electrical and optical properties of single crystal pyrite films prepared by chemical vapor deposition under atmospheric pressure." vol. 6 (2004), pp. 1269-1272.

J.R. Ares, A. Pascual, I.J. Ferrer, C. Sanchez. Thin Solid Films, "Grain and crystallite size in polycrystalline pyrite thin films." vol. 480-481 (2005), pp. 477-481.

C.H. Ho, Y.S. Huang, K.K. Tiong. Journal of Alloys and Compounds, "Characterization of near band-edge properties of synthetic p-FeS2 iron pyrite from electrical and photoconductivity measurements." vol. 422 (2006), pp. 321-327.

L.Y. Huang, L. Meng. Materials Science and Engineering, "Effects of film thickness on microstructure and electrical properties of pyrite films." vol. B137 (2007), pp. 310-314.

S.Y. Huang, X.Y. Liu, J. Chong, J. Cheng. Power Supply Technology Research and Design, "Applications of pyrite film cathodes in thermal batteries." vol. 30 (Jul. 2006), p. 574.

P.P. Chin, J. Ding, J.B. Yi' B.H. Liu. Journal of Alloys and Compounds, "Synthesis of FeS2 and FeS nanoparticles by high-energy mechanical milling and mechanochemical processing." vol. 390 (2005), pp. 255-260.

Z. Xiao, Q. Chen, Z. Yin, H. Hu, D. Wu. Thermochimica Acta, "Calorimetric investigation on mechanically activated storage energy mechanism of sphalerite and pyrite." vol. 436 (2005), pp. 10-14.

F. Kh. Urakaev. Glass Physics and Chemistry, "Properties of Glass abrasives used for mechanochemical preparation of nanocomposites." vol. 30 (2004), pp. 443-449.

S. H. Yang, S. Osmialowski and Q.C. Horn. Journal of the Electrochemical Society, "Nano-FeS2 for commercial Li/ FeS2 Primary Batteries." vol. 149 (2002), pp. A1499-A1502.

C. Iwakura, N. Isobe and H. Tamura. Electrochimica Acta, "Preparation of Iron Disulfide and its use for lithium batteries." vol. 28 (1983), pp. 269-275.

D. Wei and K. Osseo-Asare. Colloids and Surfaces A: Physicochemical and Engineering Aspects, "Aqueous synthesis of finely divided pyrite particles." vol. 121 (1997), pp. 27-36.

D. Rickard and G.W. Luther III. Chem. Rev., "Chemistry of Iron Sulfides." vol. 107 (2007), pp. 514-562.

W.M. Barnard. Economic Geology, "Synthesis of pyrite from chloride-bearing solutions." vol. 62 (1967), pp. 138-147.

H. Ohfuji and D. Rickard. Earth-Science Reviews, "Experimental Syntheses of framboids—a review." vol. 71 (2005) pp. 147-170.

I.B. Butler, M.E. Bottcher, D. Rickard and A. Oldroyd. Earth and Planetary Science Letters, "Sulfur isotope partitioning during experimental formation of pyrite via the polysulfide and hydrogen sulfide pathways: implications for the interpretation of sedimentary and hydrothermal pyrite isotope records.", vol. 228 (2004), pp. 495-509.

U.M. Graham and H. Ohmoto. Geochimica et Cosmochimica Acta, "Experimental study of formation mechanisms of hydrothermal pyrite." vol. 58 (1994), pp. 2187-2202.

R.A. Guidotti, F.W. Reinhardt, J. Dai and D.E. Reisner. Journal of Power Sources, "Performance of thermal cells and batteries made with plasma-sprayed cathodes and anodes." vol. 160 (2006), pp. 1456-1464.

C. de las Heras, J.L.M. de Vidales, I.J. Ferrer and C. Sanchez. Journal of Materials Research, "Structural and microstructural features of pyrite FeS2-x thin films obtained by thermal sulfuration of iron." vol. 11 (1996), pp. 211-220.

B. Ouertani, J. Ouerfelli, M. Saadoun, B. Bessais, M. Hajji, M. Kanzari, H. Ezzaouia, N. Hamdadou, J.C. Bernede. Materials Letters, "Transformation of amorphous iron oxide films pre-deposited by spray pyrolysis into FeS2-pyrite films." vol. 59 (2005) pp. 734-739.

D. Wan, B. B Baoyi, C. Zhou, C. Ma, Y. Wang, R. Zhang, L. Wei. Physica B, "Positron annihilation study of defects in pyrite FeS2 films prepared by sulfurizing thermally iron films." vol. 344 (2004), pp. 489-494.

S.W. Lehner, K.S. Saveage, J.C. Ayers. Journal of Crystal Growth, "Vapor growth and characterization of pyrite (FeS2) doped with Co, Ni, and As: Variations in semiconducting properties.", vol. 286 (2006), pp. 306-317.

Yang Shao-Horn, Quinn C. Horn. Electrochemica Acta, "Chemical, structural and electrochemical comparison of natural and synthetic FeS2 pyrite in lithium cells." vol. 46 (2001), pp. 2613-2621.

Patent Cooperation Treaty (PCT), International Search Report and Written Opinion for Application PCT/US2008/011041 filed Sep. 24, 2008, European Patent Office, Netherlands.

* cited by examiner under normal use conditions. Safety and reliability may be particularly important in high power cells, where short circuits in the cell can quickly lead to high temperatures and even cell venting of flammable materials.

PROCESSES FOR PRODUCING SYNTHETIC PYRITE

CROSS-REFERENCE TO RELATED APPLICATIONS

This application is entitled to the benefit of and incorporates by reference essential subject matter disclosed in Provisional Patent Application No. 60/975,973 filed on Sep. 28, 2007.

FIELD OF THE INVENTION

The present invention provides one or more processes for producing synthetic iron disulfide ($FeS_2$), and particularly $FeS_2$ having a pyrite crystal structure. The present invention also provides a cathode comprising synthetic $FeS_2$ and an electrochemical battery cell comprising such a cathode.

BACKGROUND OF THE INVENTION

Lithium batteries (batteries containing metallic lithium as the negative electrode active material) are becoming increasingly popular as portable power sources for electronic devices that have high power operating requirements. Common consumer lithium batteries include lithium/manganese dioxide ($Li/MnO_2$) and lithium/iron disulfide ($Li/FeS_2$) batteries, which have nominal voltages of 3.0 and 1.5 volts per cell, respectively.

Battery manufacturers are continually striving to design batteries with more discharge capacity. This can be accomplished by minimizing the volume in the cell taken up by the housing, including the seal and the vent, thereby maximizing the internal volume available for active materials. However, there are practical limitations on the maximum internal volume. For example, the $Li/FeS_2$ electrochemical system results in a volume increase upon discharge and the formation of reaction products. Thus, cell designs should incorporate sufficient void volume to accommodate volume increases.

Another approach to increasing discharge capacity is to modify the internal cell design and materials. How to best accomplish this can depend at least in part on the discharge requirements of the devices to be powered by the batteries. For devices with low power requirements, the quantity of active materials tends to be very important, while for devices with high power requirements, discharge efficiencies tend to be more important. Lithium batteries are often used in high power devices, since they are capable of excellent discharge efficiencies on high power discharge.

In general, battery discharge efficiency decreases rapidly with increasing discharge power. Therefore, for high power, providing high discharge efficiency is a priority. This often means using designs containing less active materials, thus sacrificing capacity on low power and low rate discharge. For example, high interfacial surface area between the negative electrode (anode) and the positive electrode (cathode) relative to the volume of the electrodes is desirable to achieve good high power discharge efficiency. This is often accomplished by using a spirally wound electrode assembly, in which relatively long, thin electrode strips are wound together in a coil. Unless the electrode compositions have a high electrical conductivity, such long, thin electrodes typically require a current collector extending along much of the length and width of the electrode strip. The high interfacial surface area of the electrodes also means that more separator material is needed to electrically insulate the positive and negative electrodes from each other. Because the maximum external dimensions are often set for the cells, either by industry standards or the size and shape of the battery compartments in equipment, increasing the electrode interfacial surface area also means having to reduce the amount of active electrode materials that can be used.

Reducing cell active material inputs in order to maximize high power performance is less desirable for batteries that are intended for both high and low power use than for batteries intended for only high power use. For example, AA size 1.5 volt $Li/FeS_2$ (FR6 size) batteries are intended for use in high power applications such as photoflash and digital still camera as well as general replacements for AA size 1.5 volt alkaline $Zn/MnO_2$ batteries, which are often used in lower power devices. In such situations it is important to maximize both high power discharge efficiency and cell input capacity. While it is generally desirable to maximize the electrode input capacity in any cell, the relative importance of doing so is greater in cells for lower power usage.

To maximize the active material inputs in the cell and mitigate the effects thereon of increasing the electrode interfacial surface area, it may be desirable to use separator materials that take up as little internal volume in the cell as possible. There are, however, practical limitations to doing so. The separator should be able to withstand the cell manufacturing processes without damage. The separator should also provide adequate electrical insulation and ion transport between the anode and cathode and, desirably, do so without developing defects resulting in internal short circuits between the anode and cathode when the cell is subjected to both normal and anticipated abnormal conditions of handling, transportation, storage and use.

Separator properties can be modified in a number of ways to improve the strength and resistance to damage. Examples are disclosed in U.S. Pat. Nos. 5,952,120; 6,368,742; 5,667, 911 and 6,602,593, which are each incorporated herein by reference in their entirety. However, changes made to increase strength can also adversely affect separator performance based on factors such as, for example, cell chemistry, electrode design and features, cell manufacturing process, intended cell use, anticipated storage and use conditions, etc.

For certain cell chemistries, maximizing the amounts of active materials in the cell can be more difficult. In lithium batteries, when the active cathode material reacts with the lithium to produce reaction products having a total volume greater than that of the reactants, swelling of the electrode assembly creates additional forces in the cell. These forces can cause bulging of the cell housing and short circuits through the separator. A possible solution to these problems includes using strong (often thicker) materials for the cell housing and inert components within the cell. Using thicker materials, however, further limits the internal volume available for active materials in cells with such active materials compared to cells with lower volume reaction products. For $Li/FeS_2$ cells, another possible solution, disclosed in U.S. Pat. No. 4,379,815, is to balance cathode expansion and anode contraction by mixing another active material with the $FeS_2$. Such active cathode materials include CuO, $Bi_2O_3$, $Pb_2Bi_2O_5$, $Pb_3O_4$, $CoS_2$, and mixtures thereof. However, adding other active materials to the cathode mixture can affect the electrical and discharge characteristics of the cell.

Just as battery manufacturers are continually trying to improve discharge capacity, they are also continually working to improve other battery characteristics, such as safety and reliability; making cells more resistant to internal short circuits can contribute to both. As is clear from the above discussion, changes made to improve resistance to internal short circuits can be counterproductive in maximizing discharge capacity.

The pyrite or iron disulfide ($FeS_2$) particles utilized in electrochemical cell cathodes are typically derived from natural ore which is crushed, heat treated, and dry milled to a particle size of 20 to 30 microns. The fineness of the grind is limited by the reactivity of the particles with air and moisture. As the particle size is reduced, the surface area thereof is increased and is more susceptible to weathering. Weathering is an oxidation process in which the iron disulfide reacts with moisture and/or air to form iron sulfates. The weathering process results in an increase in acidity and a reduction in electrochemical activity. Small pyrite particles can generate sufficient heat during oxidation to cause hazardous fires within the processing operation. Iron disulfide particles that have been utilized in cells can have particles sizes that approach the final cathode coating thickness of about 80 microns due to the inconsistencies of the dry milling process.

The dry milling process of iron disulfide is typically performed by a mining company or an intermediate wherein large quantities of material are produced. The processed iron disulfide is shipped and generally stored for extended periods of time before it can be used by the battery industry. Thus, during the storage period, the above-noted oxidation and weathering occur and the material degrades. Moreover, the large iron disulfide particle sizes can impact processes such as calendering, causing substrate distortion, coating to substrate bond disruption, as well as failures from separator damage.

Pyrite particles derived from natural ores also contain a number of impurities. In particular, natural pyrite typically contains metal-based impurities containing metals such as Si, Mn, Al, Ca, Cu, Zn, As, and Co. Impurities are believed to decrease inputs and contribute to problems such as internal shorting and other defects in batteries. Some of the impurities are soluble in the non-aqueous electrolyte and deposit on the negative electrode as dendrites. The total concentration of various impurities in natural pyrite ore varies from lot to lot, and is often at least about 3% by weight.

Synthetic pyrite has been manufactured, and may be produced having an average particle size less than 5 μm and even may be produced with an average particle size on the order of tens of nanometers. While synthetic pyrite can be produced with little or no metal-based impurities as found in natural pyrite, synthetic pyrites typically contain iron sulfides having forms other than $FeS_2$. For example, synthetic pyrite may also contain iron sulfide (FeS). Iron sulfide impurities in pyrite may also be represented as FeS, $Fe_{1-y}S$ (where y=0 to 0.2), and/or $FeS_{1.3}$. As used herein, FeS encompasses FeS, $Fe_{1-y}S$, $FeS_{1.3}$, and the like. FeS species are lower voltage materials as compared to $FeS_2$ and may affect the discharge capacities and/or rate capability of $Li/FeS_2$ cells.

SUMMARY OF THE INVENTION

The present invention provides methods/processes for forming high purity, synthetic iron disulfide ($FeS_2$). The processes provide synthetic $FeS_2$ that has reduced levels or is substantially free of impurities that can affect the electrical performance of $Li/FeS_2$ cells. The processes provide $FeS_2$ that may have less than 1% by weight of metal impurities and/or less than 1% by weight of other impurities such as FeS impurities.

The processes may provide synthetic $FeS_2$ particles ranging in size from a few microns down to tens of nanometers and can provide $FeS_2$ having a relatively large surface area.

In one aspect, the present invention provides a sulfidation process for producing synthetic $FeS_2$ that comprises reacting ferric oxide ($Fe_2O_3$), elemental sulfur, and hydrogen sulfide ($H_2S$) to form $FeS_2$. The method may be carried out above the melting point of sulfur. The process may be carried out, for example, at a temperature of from about 125° C. to about 400° C.

The sulfidation process may provide nano-$FeS_2$ having an average particle size of from about 5 to about 200 nm. Larger particle sizes may be obtained at higher reaction temperatures. Further, the average particle size may be increased by sintering the particles at a temperature in the range of from about 400° C. to below about 740° C. Sintering may be used to increase the particle size from tens of nanometers to several hundred nanometers and even up to about 1 to about 5 μm.

In one embodiment, a method of forming synthetic $FeS_2$ comprises reacting $Fe_2O_3$, elemental sulfur, and hydrogen sulfide in an inert atmosphere, the reaction being conducted at a temperature of from about 125° C. to about 400° C. for a sufficient period of time to form synthetic $FeS_2$ particles.

Unlike many other synthetic processes for making $FeS_2$, the sulfidation process in accordance with the present invention provides a process for forming high purity $FeS_2$ that may be carried out at relatively low temperatures. Depending on the sample size, the sulfidation process may also be a relatively fast process. Further, the sulfidation process provides a clean method for making $FeS_2$ because solvents are not required and the reaction does not produce by-products that must be removed or separated from the $FeS_2$. Generally, the only by-product is water, but this is typically driven off as a gas during the process.

In another aspect, the present invention provides a method for producing synthetic $FeS_2$ comprising intimately mixing iron powder and sulfur powder in the presence of a process control agent and a milling media to form a substantially homogenous iron/sulfur powder mixture. Annealing the powder mixture to form $FeS_2$ may be accomplished by heating the powder mixture at a temperature of from at least about 400° C. to below to about 740° C. The $FeS_2$ produced by milling iron and sulfur powders and treating the resulting mixture may have some porosity (or void volume).

In still another aspect, the present invention provides a method of forming $FeS_2$ comprising performing a first milling operation comprising intimately mixing iron powder and sulfur powder in the presence of a process control agent and a milling media to form a substantially homogeneous powder mixture; removing the process control agent; and performing a second milling operation comprising milling the homogeneous powder mixture for a sufficient period of time to form $FeS_2$.

Synthetic $FeS_2$ produced by the methods/processes in accordance with the present invention may be used as an active material in a positive electrode, which may be used in an electrochemical battery cell.

In one aspect, the present invention provides a cathode comprising a high purity, synthetic $FeS_2$, such as the $FeS_2$ produced by one or more of the methods described herein. The present invention also provides an electrochemical battery cell comprising such a cathode.

High purity, synthetic $FeS_2$ prepared by processes in accordance with the present invention also provides a useful control material to evaluate the effects of different active materials or metal dopant on the performance of $Li/FeS_2$ cells to be evaluated. By providing high purity $FeS_2$ that is substantially free of metal-based impurities and FeS impurities, it is possible to formulate (cathode) compositions having desired and/or controlled amounts of other active materials or metal dopants and evaluate how such materials and/or concentrations of such materials affect the performance of the cathode and/or battery cells. This cannot be done with natural pyrite where the purity level varies from lot to lot.

These and other features of the present invention will become apparent from the following detailed description in conjunction with the attached figures.

BRIEF DESCRIPTION OF THE DRAWINGS

The invention, including other features and advantages thereof, may be better understood with reference to the detailed description and the figures.

DETAILED DESCRIPTION OF THE PREFERRED EMBODIMENTS

Figure 1:
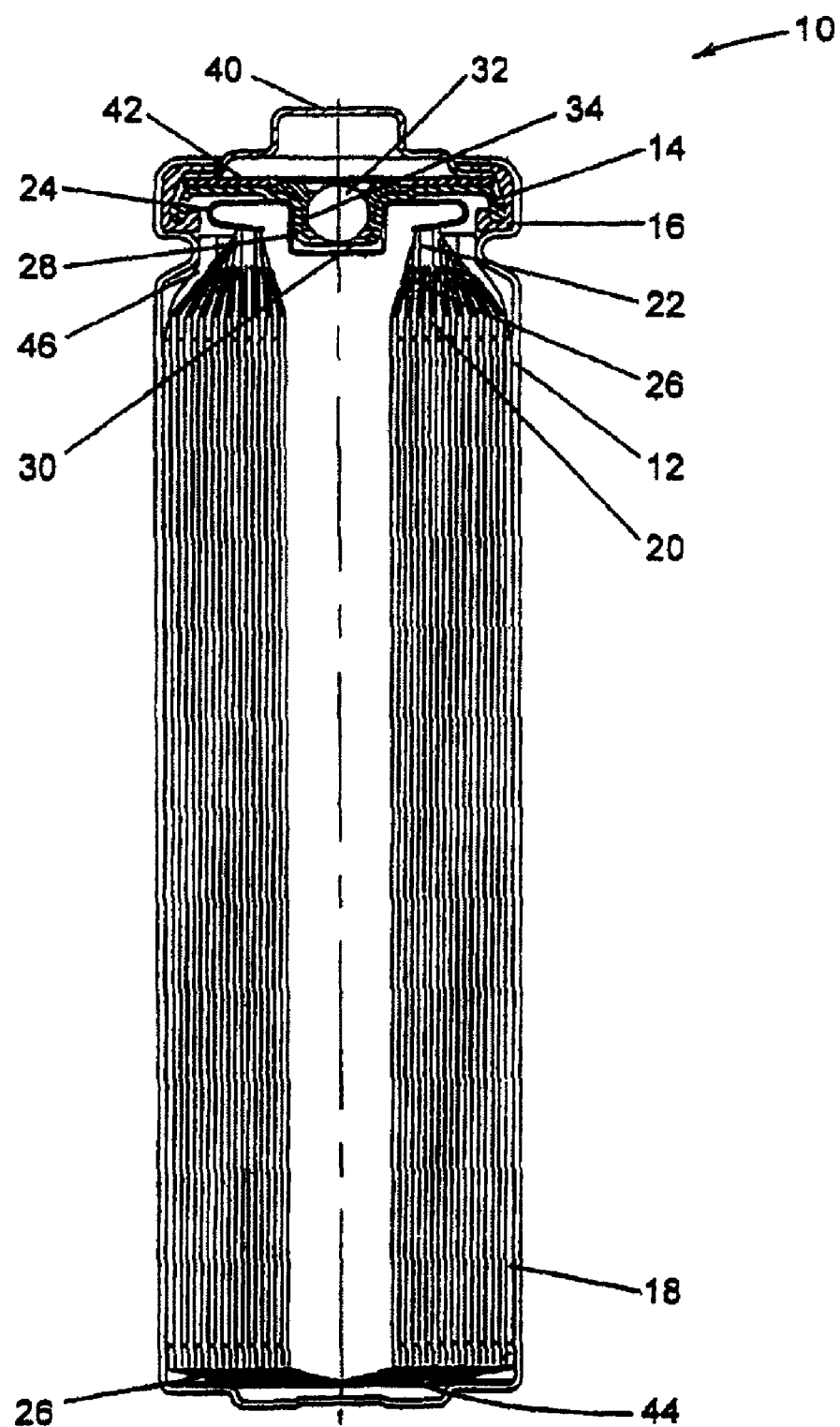
FIG. 1 is an embodiment of an electrochemical cell in accordance with the invention.

Unless otherwise specified, as used herein the terms listed below are defined as follows:

Active material—one or more chemical compounds that are part of the discharge reaction of a cell and contribute to the cell discharge capacity, including impurities and small amounts of other moieties present.

Active material mixture—a mixture of solid electrode materials, excluding current collectors and electrode leads, that contains the electrode active material.

Agglomerate—a collection of discrete particles bound together or a collection of discrete crystallites bound together.

Average particle size—the mean diameter of the volume distribution of a sample of a composition (MV). Average particle size can be measured by any suitable method. An example of a suitable method includes using a Microtrac Honeywell Particle Size Analyzer Model X-100 equipped with a Large Volume Recirculator (LVR) (4 L Volume) Model 9320. The measuring method utilizes sonification to break up agglomerates and prevent re-agglomeration. A sample of about 2.0 grams is weighed and placed into a 50 ml beaker. 20 ml of deionized water and 2 drops of surfactant (1% Aerosol OT solution prepared from 10 ml 10% Aerosol OT available from Fisher Scientific in 100 mls deionized water with the solution being well mixed). The beaker sample solution is stirred, such as with a stirring rod. The Large Volume Recirculator is filled to level with deionized water and the sample is transferred from the beaker to the Recirculator bowl. A wash bottle is used to rinse out any remaining sample particles into the Recirculator bowl. The sample is allowed to recirculate for one minute before measurements are started. The following parameters are input for $FeS_2$ particles: Transparent Particles—No (absorbing); Spherical Particles—No; Fluid Refractive Index—1.33; Run Time—60 seconds. It will be appreciated by those skilled in the arts that the above method may not be suitable for evaluating nano-size materials and that other methods may be used to evaluate the particle size of nano-sized materials.

Capacity, discharge—the actual capacity delivered by a cell during discharge, generally expressed in amp-hours (Ah) or milliamp-hours (mAh).

Capacity, input—the theoretical capacity of an electrode, equal to the weight of each active material in the electrode times the theoretical specific capacity of that active material, where the theoretical specific capacity of each active material is determined according to the following calculation: 1 [(96,487 ampere-seconds/mole)/(number of grams/mole of active material)]×(number of electrons/mole of active material)/(3600 seconds/hour)×(1000 milliampere hours/ampere-hour) (e.g., Li=3862.0 mAh/g, S=1672.0 mAh/g, $FeS_2$=893.6 mAh/g, $CoS_2$=871.3 mAh/g, $CF_x$=864.3 mAh/g, CuO=673.8 mAh/g, $C_2F$=623.0 mAh/g, FeS=609.8 mAh/g, CuS=560.7 mAh/g, $Bi_2O_3$=345.1 mAh/g, $MnO_2$=308.3 mAh/g, $Pb_2Bi_2O_5$=293.8 mAh/g and $FeCuS_2$=292.1 mAh/g).

Capacity, cell interfacial—the smaller of the negative and positive electrode capacity.

Capacity, electrode interfacial—the total contribution of an electrode to the cell theoretical discharge capacity, based on the overall cell discharge reaction mechanism(s) and the total amount of active material contained within the portion of the active material mixture adjacent to active material in the opposite electrode, assuming complete reaction of all of the active material, generally expressed in Ah or mAh (where only one of the two major surfaces of an electrode strip is adjacent active material in the opposite electrode, only the active material on that side of the electrode—either the material on that side of a solid current collector sheet or that material in half the thickness of an electrode without a solid current collector sheet—is included in the determination of interfacial capacity).

Crystallite—an entity containing a chemically homogeneous solid having a repeating, ordered atomic arrangement that coherently diffracts an X-ray beam.

Crystallite size—size of a crystallite as calculated using the Scherrer Equation.

Electrode assembly—the combination of the negative electrode, positive electrode, and separator, as well as any insulating materials, overwraps, tapes, etc., that are incorporated therewith, but excluding any separate electrical lead affixed to the active material, active material mixture or current collector.

Electrode gap—the distance between adjacent negative and positive electrodes.

Electrode loading—active material mixture dry weight per unit of electrode surface area, generally expressed in grams per square centimeter ($g/cm^2$).

Electrode packing—active material dry weight per unit of electrode surface area divided by the theoretical active material mixture dry weight per unit of electrode surface area, based on the real densities of the solid materials in the mixture, generally expressed as a percentage.

$FeS_2$ crystallite size—size of a $FeS_2$ crystallite as calculated using the Scherrer Equation and the X-Ray diffraction peak width of the {200} of pyrite in $FeS_2$.

Folded electrodes—electrode strips that are combined into an assembly by folding, with the lengths of the strips either parallel to or crossing one another.

Interfacial height, electrode assembly—the average height, parallel to the longitudinal axis of the cell, of the interfacial surface of the electrodes in the assembly.

Interfacial volume, electrode assembly—the volume within the cell housing defined by the cross-sectional area, perpendicular to the longitudinal axis of the cell, at the inner surface of the container side wall(s) and the electrode assembly interfacial height.

Nominal—a value, specified by the manufacturer, that is representative of what can be expected for that characteristic or property.

Particle—a solid containing a single crystallite or two or more crystallites chemically bound together.

Percent discharge—the percentage of the rated capacity removed from a cell during discharge.

Room temperature—between about 20° C. and about 25° C.

Spiral wound electrodes—electrode strips that are combined into an assembly by winding along their lengths or widths, e.g., around a mandrel or central core.

Void volume, electrode assembly—the volume of the electrode assembly voids per unit of interfacial height, determined by subtracting the sum of the volumes of the nonporous electrode assembly components and the solid portions of the porous electrode assembly components contained within the interfacial height from the electrode assembly interfacial volume (microporous separators, insulating films, tapes, etc. are assumed to be non-porous and non-compressible, and volume of a porous electrode is determined using the real densities of the components and the total actual volume), generally expressed in $cm^3/cm$.

A battery cell in accordance with the invention has (i) an anode comprising metallic lithium as the negative electrode active material, and (ii) a cathode comprising an active material comprising synthetic $FeS_2$. The anode and cathode may both be in the form of strips, which are joined together in an electrode assembly to provide a high interfacial surface area relative to the volumes of the electrodes containing active material. The higher the interfacial surface area, the lower the current density and the better the cell's capability to deliver high power on discharge. The cell also has a high ratio of cathode interfacial capacity to electrode assembly interfacial volume. This means that the volume of active materials in the electrode assembly is high, to provide a high discharge capacity. The high volume of active materials can be achieved by controlling a number of variables, including: the ratio of interfacial input capacity to total input capacity, the volume of the cathode current collector, the concentration of active cathode material in the cathode mixture, and the volume of separator in the electrode assembly.

FIG. 1 shows an embodiment of a cell in accordance with the present invention. The cell 10 is an FR6 type cylindrical $Li/FeS_2$ battery cell. The cell 10 has a housing that includes a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal tab (not shown). An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. The cell 10 has a separate positive terminal cover 40, which is held in place by the inwardly crimped top edge of the can 12 and the gasket 16. The can 12 serves as the negative contact terminal. Disposed between the peripheral flange of the terminal cover 40 and the cell cover 14 is a positive temperature coefficient (PTC) device 42 that substantially limits the flow of current under abusive electrical conditions. The cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10.

The cell container is often a metal can with an integral closed bottom; though a metal tube that is initially open at both ends may also be used instead of a can. The can may be steel, that is plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover is typically metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated with any suitable material such as, for example, nickel.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket may be made from any suitable thermoplastic material that provides the desired sealing properties. Material selection is based in part on the electrolyte composition. Examples of suitable materials include, but are not limited to, polypropylene, polyphenylene sulfide, tetrafluoride-perfluoroalky-1 vinylether copolymer, polybutylene terephthalate, and combinations thereof. Particularly suitable gasket materials include polypropylene (e.g., PRO-FAX® 6524 from Basell Polyolefins, Wilmington, Del., USA), polybutylene terephthalate (e.g., CELANEX® PBT, grade 1600A from Ticona-US, Summit, N.J., USA) and polyphenylene sulfide (e.g., TECHTRON® PPS from Boedeker Plastics, Inc., Shiner, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

The vent bushing may be made from a thermoplastic material that is resistant to cold flow at high temperatures (e.g., 75° C.). The thermoplastic material comprises a base resin such as, for example, ethylene-tetrafluoroethylene, polybutylene terephthlate, polyphenylene sulfide, polyphthalamide, ethylenechloro-trifluoroethylene, chlorotrifluoroethylene, perfluoroalkoxyalkane, fluorinated perfluoroethylene polypropylene and polyetherether ketone. Particularly suitable resins include ethylene-tetrafluoroethylene copolymer (ETFE), polyphenylene sulfide (PPS), polybutylene terephthalate (PBT), and polyphthalamide. The resin can be modified by adding a thermal-stabilizing filler to provide a vent bushing with the desired sealing and venting characteristics at high temperatures. The bushing can be injection molded from the thermoplastic material. TEFZELS® HT2004 (ETFE resin with 25 weight percent chopped glass filler) is an example of a suitable thermoplastic material.

The vent ball can be made from any suitable material that is stable in contact with the cell contents and provides the desired cell sealing and venting characteristic. Glasses or metals, such as stainless steel, can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance. Battery grade lithium-aluminum foil containing 0.5 weight percent aluminum is available from Chemetall Foote Corp., Kings Mountain, N.C., USA.

The anode may have a current collector, within or on the surface of the metallic lithium. As in the cell in FIG. 1, a separate current collector may not be needed, since lithium has a high electrical conductivity, but a current collector may be included, for example, to maintain electrical continuity within the anode during discharge, as the lithium is consumed. When the anode includes a current collector, it may be made of copper because of its conductivity, but other conductive metals can be used as long as they are stable inside the cell.

A thin metal strip often serves as an electrical lead, or tab, connecting the anode to one of the cell terminals (the can in the case of the FR6 cell shown in FIG. 1). The metal strip is often made from nickel or nickel plated steel and affixed directly to the lithium. This may be accomplished by embedding an end of the lead within a portion of the anode or by simply pressing an end of the lead onto the surface of the lithium foil.

The cathode may be in the form of a strip that comprises a current collector and a cathode formulation that includes one or more electrochemically active materials, usually in particulate form. The cathode formulation, which is typically a slurry, comprises synthetic iron disulfide ($FeS_2$) as an active material. The active material may comprise greater than about 50 weight percent $FeS_2$. The active material may comprise at least 95 weight percent $FeS_2$, at least 99 weight percent $FeS_2$, and in one embodiment, $FeS_2$ is the sole active cathode material. In one embodiment, the $FeS_2$ of the active material comprises synthetic $FeS_2$. The $FeS_2$ of the active material may comprise a mixture of synthetic $FeS_2$ and $FeS_2$ derived from a natural ore. Alternatively, the $FeS_2$ of the active material may be comprised of only synthetic $FeS_2$.

The cathode can also contain one or more additional active materials, depending on the desired cell electrical and discharge characteristics. The additional active cathode material may be any suitable active cathode material. Examples of other active materials include, but are not limited to, $Bi_2O_3$, $C_2F$, $CF_x$, $(CF)_n$, $CoS_2$, $CuO$, $CuS$, $FeS$, $FeCuS_2$, $MnO_2$, $Pb_2Bi_2O_5$, $S$, or mixtures of two or more thereof.

The synthetic $FeS_2$ suitable for use in the active material may have a purity, on a metals basis, of at least about 97% and may be about 99% or higher. As previously described, metal-based impurities may include metals such as, but not limited to, Mn, Al, Ca, Cu, Zn, As, Co, and the like. In one embodiment, the total concentration of metal impurities by weight of the synthetic $FeS_2$ is about 1% or less, in another embodiment about 0.1% or less, and in another embodiment about 0.01% or less.

Desirably, the synthetic $FeS_2$ has a relatively low concentration of FeS impurities. In one embodiment, the synthetic $FeS_2$ has a FeS content by weight of the $FeS_2$ of about 3% or less, in another embodiment about 1.0% or less, in another embodiment about 0.1% or less, and in another embodiment about 0.01% or less.

The synthetic $FeS_2$ may have a relatively small average particle size. Electrochemical cells prepared with $FeS_2$ particles having a reduced average particle size exhibit increased cell voltage at any given depth of discharge, irrespective of cell size. The synthetic $FeS_2$ particles may have an average particle size less than about 10 µm, less than about 5 µm, or less than about 3 µm. In one embodiment, the synthetic $FeS_2$, may have an average particle size in the range of from about 1 to about 5 µm. The synthetic $FeS_2$ may even have an average particle size in the sub-micron range (<1 µm) range including, but not limited to, less than about 500 nm, less than about 250 nm, less than about 100 nm, even less than about 10 nm. In one embodiment, the synthetic $FeS_2$ may have an average particle in the range of from about 5 nm to about 200 nm.

Higher purity, synthetic $FeS_2$ may be provided by one or more of the processes in accordance with the present invention. In one embodiment, $FeS_2$ may be formed by a sulfidation process. In another embodiment, synthetic $FeS_2$ may be formed by a milling process. These processes are now described in detail.

Sulfidation Process

In one embodiment, synthetic $FeS_2$ may be formed by a sulfidation process that comprises reacting (i) ferric oxide ($Fe_2O_3$), (ii) elemental sulfur, and (iii) hydrogen sulfide ($H_2S$) for a sufficient period of time to form $FeS_2$. While not wishing to be bound by any theory, the reaction is believed to proceed as follows:

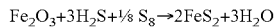

$$Fe_2O_3 + 3H_2S + \tfrac{1}{8} S_8 \rightarrow 2FeS_2 + 3H_2O$$

The ferric oxide may be provided as nanoparticles, which may also be referred to as "nano rust." The ferric oxide particles may have a particle size less than about 100 nanometers (nm). The ferric oxide particles may have a particle size of from about 1 to about 100 nm; in one embodiment the ferric oxide particles have a particle size of from about 3 to about 50 nm; and in another embodiment the ferric oxide particles have a particle size of from about 3 to about 10 nm. Applicants have found that if the ferric oxide particles are too large, the reaction may not go to completion to form $FeS_2$. Rather, if the ferric oxide particles are too large, the resulting product may comprise an unreacted ($Fe_2O_3$) core having a $FeS_2$ coating on the outer surface.

The elemental sulfur component (ii) may be provided as a solid. Solid sulfur may be provided in any suitable form including, for example, molten sulfur. The size of the solid sulfur particles is not particularly limited. In one embodiment, the sulfur may be provided as particles having a particle size of about 1 to about 5 µm.

Hydrogen sulfide ($H_2S$) is provided as a gas. In one embodiment, the $H_2S$ may be provided as 100 volume percent of $H_2S$. In another embodiment, the $H_2S$ may be provided as a volume of $H_2S$ in a carrier gas. The carrier gas may be an inert gas such as, for example, nitrogen ($N_2$). For example, in one embodiment, the $H_2S$ may be provided as a gas comprising from about 1% by volume to about 99% by volume of $H_2S$ in a carrier gas such as $N_2$; in another embodiment from about 3% by volume to about 70% by volume; and in another embodiment from about 6% by volume to about 40% by volume.

Applicants have found that $FeS_2$ may be obtained with the disclosed sulfidation process at relatively low temperatures, e.g., below about 400° C. Generally, the reaction may be conducted at a temperature above the melting point of sulfur (about 113° C.) and below about 400° C. In one embodiment, the reaction may be carried out at a temperature in the range of from about 125° C. to about 400° C.; and in another embodiment from about 125° C. to about 300° C. In another embodiment, the reaction may be carried out at a temperature in the range of from about 125° C. to about 200° C. The temperature may be adjusted as desired to produce $FeS_2$ particles of different sizes, with larger particles being produced at higher reaction temperatures. Complete sulfidation to $FeS_2$ may be realized at relatively low temperatures such as from above the melting point of sulfur to about 125° C. Further, at temperatures nearer to the melting point of sulfur (e.g., around 125° C.), the resulting $FeS_2$ particles stay relatively small and have a relatively large surface area.

The reactants may be combined in about a 1:3:0.125 molar ratio of $Fe_2O_3$:$H_2S$:$S_8$. The sulfidation process may be carried out by first reacting the $Fe_2O_3$ and elemental sulfur at a temperature above the melting point of sulfur for a selected period of time. After reacting the $Fe_2O_3$ and sulfur for a desired period of time, the $H_2S$ may be introduced to the system and the reaction may proceed for a period of time sufficient for complete sulfidation to occur. At a reaction temperature of about 125° C., for example, complete sulfidation may occur in less than about five hours depending upon sample size. In one embodiment, the $Fe_2O_3$ and the sulfur may be mixed at a first temperature, e.g., about 125° C., and the temperature may be increased after adding the $H_2S$. It will be appreciated that the reaction need not be conducted at a single temperature. For example, the reaction may be held at a first temperature for a selected period of time (e.g., 125° C.) and then a temperature ramp may be used to increase the temperature at a desired rate to a second selected temperature (e.g., about 200° C.). As described above, higher temperatures may be desirable to provide larger $FeS_2$ particles.

It may be desirable to conduct the reaction in an inert atmosphere such as, for example, argon, nitrogen, or the like. In one embodiment, the $Fe_2O_3$ and sulfur may be charged to the system, and the system is flushed with an inert gas at least prior to the addition of the $H_2S$.

The sulfidation process provides $FeS_2$ particles having a particle size of less than about 1 µm. The sulfidation process may provide particles having an average particle size of about 250 nm or less, about 200 nm or less, about 100 nm or less, even about 10 nm or less. In one embodiment, the $FeS_2$ particles may have an average particle size of about 200 nm (which may indicate that the majority of the distribution falls between about 70 nm and about 600 nm). In one embodiment, the process provides $FeS_2$ particles having a particle size of from about 5 to about 600 nm; and in another embodiment from about 5 to about 200 nm. The $FeS_2$ particles may have a crystallite size in the range of from about 5 to about 100 nm. As described above, the particles size may be controlled by selecting the size of the starting $Fe_2O_3$ particles and/or the temperature at which the reaction is run (with larger particles being obtained at higher reaction temperatures).

If desired, larger $FeS_2$ particles may be produced by sintering the $FeS_2$ particles obtained from the sulfidation process. Sintering may be accomplished by heating the particles at a temperature in the range of from about 400° C. to below the temperature at which $FeS_2$ decomposes (about 740° C.). For example, the $FeS_2$ particles may be sintered at a temperature in the range of from about 400° C. to about 700° C. for a sufficient period of time to increase the particle size of the $FeS_2$ particles. Typically, the sintering step should be carried out under vacuum at a pressure below atmospheric pressure and/or in an inert atmosphere. Sintering may be used to increase the crystallite size of the $FeS_2$ particles from tens of nanometers to the order of hundreds of nanometers, or even several microns. For example, the $FeS_2$ particles may have a crystallite size of from about 35 nm to about 3 µm after sintering. In one embodiment, $FeS_2$ particles obtained from the sulfidation process may be sintered at a temperature of from about 400-500° C. to increase the particle size from tens of nanometers to from about 150-200 nm (the $FeS_2$ particles may have a crystallite size of from about 35 to about 200 nm). Sintering may also be used to increase the $FeS_2$ particle size from tens or hundreds of nanometers to about 1 to about 3 im. By heating at a temperature of about 700° C. under vacuum, for example, $FeS_2$ particles having a particle size of about 200 nm to about 3 µm may be obtained from nano-sized particles.

$FeS_2$ particles produced by the sulfidation process may exhibit both pyrite and marcasite crystal phases. The resulting $FeS_2$ product exists primarily in the pyrite phase but may include traces of marcasite crystals. While not wishing to be bound by any theory, it has been found that sintering the $FeS_2$ particles may also convert the marcasite crystals to pyrite crystals. For example, the marcasite crystals may be converted to pyrite crystals by heating the $FeS_2$ particles, such as by sintering the particles at a temperature above about 400° C. and below about 740° C. For example, the marcasite crystals may be converted to pyrite crystals by sintering at a temperature of about 400° C. to about 500° C.

The sulfidation process provides high purity synthetic $FeS_2$ particles. In one aspect, the synthetic $FeS_2$ has a high purity on a metals basis. The $FeS_2$ may have a purity, on a metals basis, greater than about 97% and desirably, having a purity of greater than about 99%. In one embodiment, the total concentration of metal impurities by weight of the synthetic $FeS_2$ is about 1% or less, in another embodiment about 0.1% or less, and in another embodiment about 0.01% of less.

The synthetic $FeS_2$ produced by the sulfidation process may also be considered as having a high purity on the basis of iron sulfide (FeS) impurities. The $FeS_2$ produced by the sulfidation process may have less than about 3% by weight or iron sulfide impurities, and desirably less than 1% by weight of iron sulfide impurities. In one embodiment, the $FeS_2$ has iron sulfide impurities of about 0.1% or less and in another embodiment about 0.01% or less.

Additionally, the synthetic $FeS_2$ produced by the sulfidation process may also be substantially free of oxide species, e.g., sulfates. In one embodiment, the $FeS_2$ has less than about 3% by weight of oxide species. Nano-$FeS_2$ formed by the sulfidation process typically has a relatively large surface area (e.g., about 100 $m^2/g$ or higher) and may be more susceptible to oxidation than natural pyrite or larger $FeS_2$ particles. A mono layer of oxygen on nano-sized $FeS_2$ could provide oxide impurities in the range of about 0 to about 10% by weight. Therefore, it may be desirable to limit exposure of nano-$FeS_2$ particles to oxygen containing environments until they can be formulated into a cathode formulation or sintered to provide larger $FeS_2$ particles. For example, it may be desirable to store the nano-$FeS_2$ particles in a dry box until they are to be formulated into a cathode formulation and/or prepare the cathode formulation in a dry box.

The method may also include coating the $FeS_2$ particles with a protective coating material to reduce or prevent oxidation of the $FeS_2$ particles. In one aspect, the coating may be a temporary coating that is dissolvable in a cathode formulation environment. In another embodiment, the coating may be formed from a conductive material. Suitable conductive materials include, but are not limited to carbon materials, metal materials, metal oxides, and organic conductive materials. Suitable metal oxides include, for example, cobalt oxide, manganese oxide, and the like. Suitable organic conductive materials include, for example, polyphenylene derivatives. A particularly suitable conductive material for use in the coating layer is a carbon coating. The carbon material may comprise, for example, acetylene black, graphite, carbon black, mixtures of two or more thereof, and the like. The protective coating layer may be applied to the $FeS_2$ particles in any suitable manner including spraying, dipping, brushing, and the like. In one embodiment, the protective coating layer may be applied using spray pyrolysis. The thickness or coating weight of the protective coating layer may be selected as desired for a particular purpose or intended use, but should generally be sufficient to adequately protect the $FeS_2$ particles against oxidation.

The sulfidation process is a relatively "clean" process and does not require additional separation or cleaning steps to obtain the final $FeS_2$ product. When the process utilizes solid sulfur as a starting material, the process may be run without any solvents that would require removal or clean up. Further, the only other product of the sulfidation process is water ($H_2O$). The water, however, evaporates because the reaction is carried out a temperature above the melting point of sulfur (about 113° C.), which is also above the boiling point of water.

Milling Process

In another embodiment, synthetic $FeS_2$ may be prepared by a process comprising (i) mixing iron powder and sulfur powder to provide a substantially homogenous iron/sulfur powder mixture, and (ii) treating the powder mixture under conditions sufficient to form $FeS_2$.

Mixing of the iron and sulfur powder may be accomplished by any suitable technique such as, for example, mechanical milling. Mechanical milling may be accomplished using any suitable milling devices including, but not limited to, roll mills, granulating mills, ball mills, media mills, bead mills, head mills, and the like. Milling and intimate mixing of the iron and sulfur powders may be accomplished using any suitable milling media including, but not limited to, steel, ceramic, glass, zirconia media, and the like. In one embodiment, the milling media is substantially free of iron. Despite containing iron, steel shot is particularly suitable as the milling media. The milling media may be provided in any suitable amount as desired. For example, the weight ratio of iron and sulfur powder to milling media may be, for example, in the range of from about 1:4 to about 1:10, in the range of from about 1:5 to about 1:10, or in the range of from about 1:7 to about 1:10. In one embodiment, the weight ratio of iron and sulfur powder to milling media may be about 1:7.

The iron and sulfur powders are mixed in the presence of a process control agent (which may also be referred to as a processing agent). The process control agent is not particularly limited except that it should be substantially free of oxygen. Suitable materials for the process control agent include hydrocarbons such as, for example, alkanes including but not limited to pentane, heptane, hexane, octane, nonane, decane, combinations of two or more thereof, and the like. The process control agent should be present in an amount sufficient to facilitate forming a homogenous powder mixture from the iron and sulfur powders during the milling process. If too little process control agent is present, the process control agent may be consumed by the powder(s), the powders may agglomerate, and/or intimate mixing of the powders may not occur (e.g., the powders may attach to the walls of the mixing vessel resulting in poor milling efficiency) such that a homogenous mixture is not obtained. In one embodiment, the process control agent may be present in an amount of from about 5 to about 15 percent by weight of the total weight of the iron powder, sulfur powder, and milling media. In one embodiment, the process control agent is present in an amount of from about 7 to about 10 percent by weight of the total weight of iron powder, sulfur powder, and milling media.

Generally, the iron powder and sulfur powder should be present in at least a 1:2 molar ratio of iron to sulfur (i.e., at least a stoichiometric ratio of Fe to S to form $FeS_2$.) It may be desirable to provide the sulfur powder in an amount in excess of that required by the stoichiometric ratio to ensure that a sufficient amount of sulfur is present to form $FeS_2$. For example, if steel is used as the milling media, the system may pick up some iron from the milling media, which may result in the formation of a small amount of FeS during the treatment operation. If a slight excess of sulfur is used, the extra sulfur can react with the extra iron that may be present from the milling media.

The iron and sulfur powders may be mixed for a sufficient period of time to provide a homogenous iron/sulfur powder mixture. It will be appreciated that the time for mixing may vary depending on the milling process used, the size of the system (e.g., the total amount of iron and sulfur powder), the concentration of milling media, the type of milling media, and the like, and may be readily ascertained by a person skilled in the art. In one embodiment, the iron and sulfur powders are mixed by ball milling for a period of about five hours. To provide a high purity, synthetic $FeS_2$ product using a milling method, the mixing process should be carried out under conditions that disfavor the formation of byproducts such as oxides and sulfides. Therefore, it may be desirable to carry out the mixing operation in an inert atmosphere such as, for example, an argon atmosphere.

Following mixing of the iron and sulfur powder, the substantially homogenous mixture is treated under sufficient conditions to form $FeS_2$. Typically, the process control agent is removed prior to treating the powder mixture to form $FeS_2$. The process control agent may be removed by any suitable method including, for example, evaporation. In one embodiment, the powder mixture is treated by annealing the powder mixture at a sufficient temperature for a sufficient period of time to form $FeS_2$. For example, $FeS_2$ may be formed by annealing the iron/sulfur powder mixture at a temperature in the range of from at least about 400° C. to a temperature below the decomposition temperature of $FeS_2$ (about 740° C.). In one embodiment, the powder mixture is annealed at a temperature of from about 450° C. to about 500° C. Heating may be accomplished using a temperature ramp or gradient to reach the desired annealing temperature. In one embodiment, the iron/sulfur powder mixture is heated using a temperature ramp of from about 1 to about 3° C. per minute up to 450° C., and then holding the temperature 450° C. for about forty-five minutes. A heating ramp may be desirable to take the temperature through the melting point of sulfur at a relatively slow rate to ensure that all of the sulfur reacts with the iron to form $FeS_2$ (and avoid forming byproducts such as FeS). The rate of heating may be selected as desired to suit a particular need or purpose. For example, the temperature may be increased at a first rate through the melting point of sulfur and then increased at a faster rate until the final temperature of heating is reached.

In another embodiment, the powder mixture is treated to form $FeS_2$ by subjecting the powder mixture to a subsequent milling operation. In particular, after milling the iron and sulfur powder to form the powder mixture, the processing agent may be removed from the powder mixture, and the powder mixture may be milled to form $FeS_2$. The second milling operation may be accomplished using any suitable milling method including those described above.

$FeS_2$ formed by a milling method in accordance with the present invention may have an average particle size of from about 1 μm to about 10 μm. Additionally, the $FeS_2$ particles formed by a milling method in accordance with the present invention may exhibit some porosity (and exhibit some void volume).

$FeS_2$ produced by the milling method has a purity, on a metals basis, of at least about 97% and desirably has a purity of at least about 99%. In one embodiment, the total concentration of metal impurities by weight of the synthetic $FeS_2$ is about 1% or less, in another embodiment about 0.1% or less, and in another embodiment about 0.01% of less. Additionally, $FeS_2$ produced by the milling method contains about 3% by weight or less of FeS impurities and desirably about 1% by weight or less of FeS impurities. In one embodiment, the $FeS_2$ has iron sulfide impurities of about 0.1% or less and in another embodiment about 0.01% or less.

Some process control agent may become entrained in the $FeS_2$ produced by the milling method. The process control agent may become entrained in the product from milling the iron and sulfur powders and/or during the annealing operation. More particularly, carbon from the process control agent may become entrained in the $FeS_2$. The hydrogen atoms from the hydrocarbon process control agent may escape or be driven off during the annealing operation with carbon being left behind in the $FeS_2$. Without being bound by any particular theory, the carbon may be present in a variety of forms including, but not limited to, amorphous carbon, graphite, carbide, and solid solution in $FeS_2$.

The amount of carbon entrained in the $FeS_2$ may be a function of the milling time and the amount of process control agent used in milling the iron and sulfur powders. The amount of entrained carbon generally increases with longer milling times. For a given milling time, the amount of entrained process control agent (and, therefore, carbon) increases with a decreasing amount of process control agent added to the initial charge of iron and sulfur powder.

The amount of carbon entrained in the $FeS_2$ may be about 1% or less by weight of the $FeS_2$. In one embodiment, the amount of carbon retained in the powder is about 0.50% or less by weight of the $FeS_2$. In one embodiment, the amount of carbon retained in the powder is about 0.25% or less by weight of the $FeS_2$. In one embodiment, the amount of carbon retained in the powder is about 0.15% or less by weight of the $FeS_2$.

If desired, additives or dopants could be added to the initial charge of the milling method to provide $FeS_2$ having a particular additive or dopant concentration. The dopant additive could be, for example, one or more metals, graphite, or carbon black.

In addition to the active material, the cathode mixture typically contains other materials. For example, a binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as, for example, the electrical conductivity of the active material and binder, the thickness of the mixture on the current collector, the current collector design, and the like. Small amounts of various additives may also be used to enhance cathode manufacturing and cell performance. The following are examples of active material mixture materials for $Li/FeS_2$ cell cathodes. Graphite: KS-6 and TIMREX® MX15 grades synthetic graphite from Timcal America, Westlake, Ohio, USA. Carbon black: Grade C55 acetylene black from Chevron Phillips Company LP, Houston, Tex., USA. Binder: ethylene/propylene copolymer (PEPP) made by Polymont Plastics Corp. (formerly Polysar, Inc.) and available from Harwick Standard Distribution Corp., Akron, Ohio, USA; non-ionic water soluble polyethylene oxide (PEO): POLYOX® from Dow Chemical Company, Midland, Mich., USA; and G1651 grade styrene-ethylene/butylenes-styrene (SEBS) block copolymer from Kraton Polymers, Houston, Tex. Additives: FLUO HT® micronized polytetrafluoroethylene (PTFE) manufactured by Micro Powders Inc., Tarrytown, N.Y., USA (commercially available from Dar-Tech Inc., Cleveland, Ohio, USA) and AEROSIL® 200 grade fumed silica from Degussa Corporation Pigment Group, Ridgefield, N.J.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

$FeS_2$ cathodes may be made by roll coating a slurry of active material mixture materials in a highly volatile organic solvent (e.g., trichloroethylene) onto both sides of a sheet of aluminum foil, drying the coating to remove the solvent, calendering the coated foil to compact the coating, slitting the coated foil to the desired width, and cutting strips of the slit cathode material to the desired length. It is desirable to use cathode materials with small particle sizes to minimize the risk of puncturing the separator.

The cathode is electrically connected to the positive terminal of the cell. This may be accomplished with an electrical lead, often in the form of a thin metal strip or a spring, as shown in FIG. 1. The lead is often made from nickel plated stainless steel.

The separator may be a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. It may be desirable to minimize the amount of separator extending beyond the electrodes.

To provide good high power discharge performance it may be desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference. Suitable separator materials should also be strong enough to withstand cell manufacturing processes as well as pressure that may be exerted on the separator during cell discharge without tears, splits, holes or other gaps developing that could result in an internal short circuit.

To minimize the total separator volume in the cell, the separator should be as thin as possible, but at least about 1 µm or more so a physical barrier is present between the cathode and anode to prevent internal short circuits. That said, the separator thickness may range from about 1 to about 50 µm, desirably from about 5 to about 25 µm, and preferably from about 10 to about 16 or about 20 µm. The required thickness will depend in part on the strength of the separator material and the magnitude and location of forces that may be exerted on the separator where it provides electrical insulation.

A number of characteristics besides thickness can affect separator strength. One of these is tensile stress. A high tensile stress is desirable, such as, for example, at least 800 kilograms of force per square centimeter (kgf/cm$^2$), and desirably at least 1000 (kgf/cm$^2$). Because of the manufacturing processes typically used to make microporous separators, tensile stress is typically greater in the machine direction (MD) than in the transverse direction (TD). The minimum tensile stress required can depend in part on the diameter of the cell. For example, for a FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. If the tensile stress is too low, manufacturing and internal cell forces can cause tears or other holes. In general, the higher the tensile stress the better from the standpoint of strength. However, if the tensile stress is too high, other desirable properties of the separator may be adversely affected.

Tensile stress can also be expressed in kgf/cm, which can be calculated from tensile stress in kgf/cm$^2$ by multiplying the latter by the separator thickness in cm. Tensile stress in kgf/cm is also useful for identifying desirable properties related to separator strength. Therefore, it may be desirable that the separator have a tensile stress of at least 1.0 kgf/cm, preferably at least 1.5 kgf/cm and more preferably at least 1.75 kgf/cm in both the machine and transverse directions. For cells with diameters greater than about 0.45 inch (11.4 mm), a tensile stress of at least 2.0 kgf/cm is most preferable.

Another indicator of separator strength is its dielectric breakdown voltage. Preferably the average dielectric breakdown voltage will be at least 2000 volts, more preferably at least 2200 volts. For cylindrical cells with a diameter greater than about 0.45 in (11.4 mm), the average dielectric breakdown voltage is most preferably at least 2400 volts. If the dielectric breakdown voltage is too low, it is difficult to reliably remove cells with defective or damaged separators by electrical testing (e.g., retention of a high voltage applied to the electrode assembly before the addition of electrolyte) during cell manufacturing. It is desirable that the dielectric breakdown is as high as possible while still achieving other desirable separator properties.

The average effective pore size is another of the more important indicators of separator strength. While large pores are desirable to maximize ion transport through the separator, if the pores are too large the separator will be susceptible to penetration and short circuits between the electrodes. The preferred maximum effective pore size is from 0.08 µm to 0.40 µm, more preferably no greater than 0.20 µm.

The BET specific surface area is also related to pore size, as well as the number of pores. In general, cell discharge performance tends to be better when the separator has a higher specific surface area, but the separator strength tends to be lower. It is desirable for the BET specific surface area to be no greater than 40 m$^2$/g, but it may be desirable that it be at least 15 m$^2$/g, or at least 25 m$^2$/g.

A low area specific resistance may be desirable for good high rate and high power cell discharge performance. Thinner separators tend to have lower resistances, but the separator should also be strong enough, limiting how thin the separator can be. Desirably the area specific resistance is no greater than 4.3 ohm-cm$^2$, more preferably no greater than 4.0 ohm-cm$^2$, and most preferably no greater than 3.5 ohm-cm$^2$.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer may help minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16 MMS grade has a 16 µm nominal thickness.

The anode, cathode, and separator strips are combined together in an electrode assembly. The electrode assembly may be a spirally wound design, such as that shown in FIG. 1, made by winding alternating strips of cathode, separator(s), anode, and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing.

Rather than being spirally wound, the electrode assembly may be formed by folding the electrode and separator strips together. The strips may be aligned along their lengths and then folded in an accordion fashion, or the anode and one electrode strip may be laid perpendicular to the cathode and another electrode strip and the electrodes alternately folded one across the other (orthogonally oriented), in both cases forming a stack of alternating anode and cathode layers.

The electrode assembly is inserted into the housing container. In the case of a spirally wound electrode assembly, whether in a cylindrical or prismatic container, the major surfaces of the electrodes are perpendicular to the side wall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the anode is adjacent the majority of the total area of the major surfaces of the cathode through the separator, and the outermost portions of the electrode major surfaces are adjacent to the side wall of the container. In this way, expansion of the electrode assembly due to an increase in the combined thicknesses of the anode and cathode is constrained by the container side wall (s).

A nonaqueous electrolyte, containing water only in very small quantities as a contaminant (e.g., no more than about 500 parts per million by weight, depending on the electrolyte salt being used), is used in the battery cell of the invention. Any nonaqueous electrolyte suitable for use with lithium and active cathode material may be used. The electrolyte contains one or more electrolyte salts dissolved in an organic solvent. For a $Li/FeS_2$ cell, examples of suitable salts include lithium bromide, lithium perchlorate, lithium hexafluorophosphate, potassium hexafluorophosphate, lithium hexafluoroarsenate, lithium trifluoromethanesulfonate, and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide, and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in $Li/FeS_2$ cells because the ethers are more stable than with $MnO_2$ cathodes, so higher ether levels can be used. Suitable ethers include, but are not limited to acyclic ethers such as 1,2-dimethoxyethane, 1,2-diethoxyethane, di(methoxyethyl) ether, triglyme, tetraglyme, and diethyl ether; and cyclic ethers such as 1,3-dioxolane, tetrahydrofuran, 2-methyl tetrahydrofuran, and 3-methyl-2-oxazolidinone. A particularly suitable non-aqueous electrolyte is an electrolyte comprising lithium iodide in a solvent comprising at least one ether as disclosed in U.S. Pat. No. 5,514,491, the entire disclosure of which is incorporated herein by reference.

Accordingly, various combinations of electrolyte salts and organic solvents can be utilized to form the electrolyte for electrochemical cells. The molar concentration of the electrolyte salt can be varied to modify the conductive properties of the electrolyte. Examples of suitable nonaqueous electrolytes containing one or more electrolyte salts dissolved in an organic solvent include, but are not limited to, a 1 mole per liter solvent concentration of lithium trifluoromethanesulfonate (14.60% by weight) in a solvent blend of 1,3-dioxolane, 1,2-diethoxyethane, and 3,5-dimethyl isoxazole (24.80:60.40:0.20% by weight), which has a conductivity of 2.5 mS/cm; a 1.5 moles per liter solvent concentration of lithium trifluoro-methanesulfonate (20.40% by weight) in a solvent blend of 1,3-dioxolane, 1,2-diethoxyethane, and 3,5-dimethylisoxazole (23.10:56.30:0.20% by weight), which has a conductivity of 3.46 mS/cm; and a 0.75 mole per liter solvent concentration of lithium iodide (9.10% by weight) in a solvent blend of 1,3-dioxolane, 1,2-diethoxyethane, and 3,5-dimethylisoxazole (63.10:27.60:0.20% by weight), which has a conductivity of 7.02 mS/cm. Electrolytes utilized in the electrochemical cells of the present invention have conductivity generally greater than about 2.0 mS/cm, desirably greater than about 2.5 or about 3.0 mS/cm, and preferably greater than about 4, about 6, or about 7 mS/cm.

Specific anode, cathode, and electrolyte compositions and amounts can be adjusted to provide the desired cell manufacturing, performance, and storage characteristics. For example, the cell may be designed to provide an anode to cathode input ratio of less than 1.0, equal to 1.0, or greater than 1.0. A cell with an anode to cathode input ratio of less than 1.0 may be said to have an anode under-balance, and a cell with an anode to cathode input ratio of greater than 1.0 may be said to have an anode over-balance. It may be desirable to provide a cell having an anode to cathode input ratio of less than or equal to 1.0. As used herein, the anode to cathode input ratio may be calculated as follows:

Anode Capacity Per Linear Inch:

(foil thickness)×(interfacial electrode width)×1 inch×(density of lithium foil at 20° C.)×(lithium energy density, 3861.7 mAh/gm).

Cathode Capacity Per Linear Inch:

(final cathode coating thickness)×(interfacial electrode width)×1 inch×(cathode dry mix density)×(final cathode packing percentage)×(dry weight percent $FeS_2$)×(percent purity $FeS_2$)×($FeS_2$ energy density, 893.58 mAh/gm)

Anode/cathode input ratio=anode capacity per linear inch/cathode capacity per linear inch "Interfacial electrode width" as used herein is the linear dimension that shares an interfacial area between the cathode and the anode. "Final cathode coating thickness" refers to the coating thickness after any calendering operation or other densification processing of the cathode. "Final cathode packing percentage" refers to the solid volume percentage after any calendering operation or other densification processing and is equivalent to 100 percent less the void volume percentage after any calendering operation or other densification processing of the cathode. The "cathode dry mix density" refers to the additive density of the solid components of the cathode coating.

The cell can be closed and sealed using any suitable process. Such processes may include, but are not limited to, crimping, redrawing, colleting, and combinations thereof.

For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold the gasket, cover assembly, PTC device and terminal cover and complete the sealing of the open end of the can by the gasket.

The above description is particularly relevant to cylindrical Li/FeS$_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent designs.

Features of the invention and advantages thereof are further illustrated in the following examples:

EXAMPLES

Comparative Example 1

Figure 2:
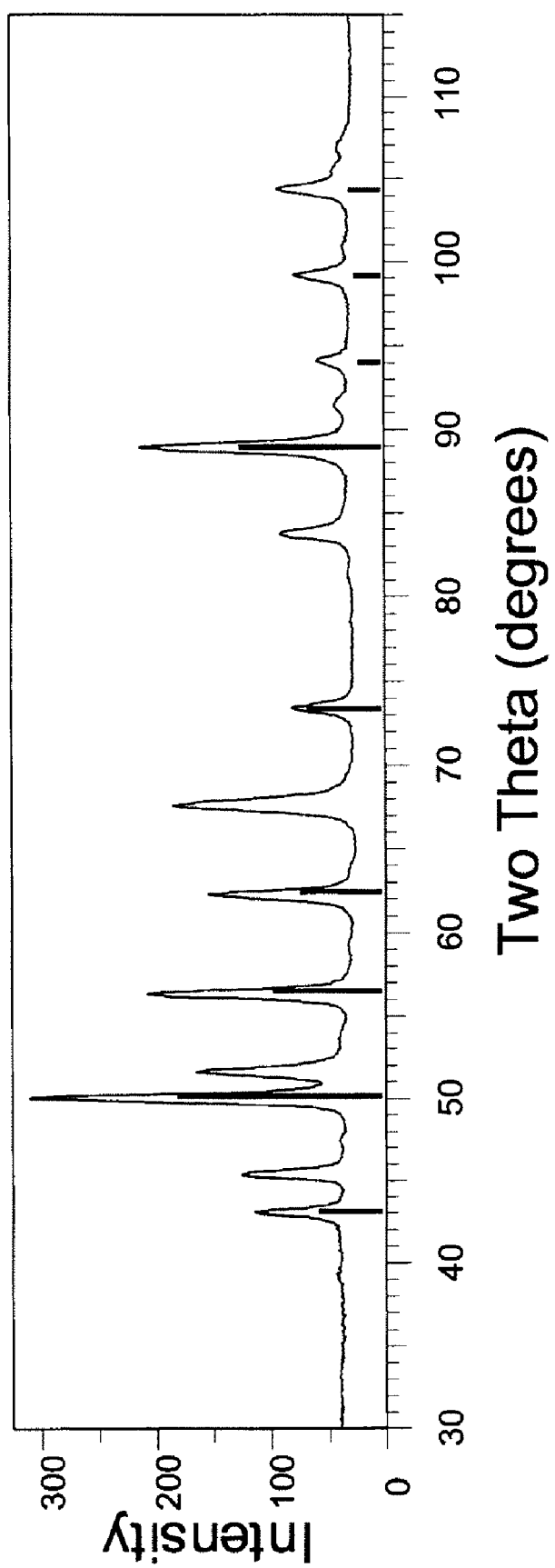
FIG. 2 is an x-ray diffraction (XRD) pattern of synthetic $FeS_2$ produced by a comparative synthetic process.

Synthetic FeS$_2$ is prepared by reacting Fe$_2$O$_3$ and excess hydrogen sulfide (H$_2$S) at 300-400° C. for 8-24 hours as described by Tamura et al (Electrochimica Acta, 28 (1983) page 269). In a typical reaction, 5 g of oxide was loaded into a porcelain boat that was subsequently loaded into a glass tube. The tube was placed in a high temperature furnace. The atmosphere in the tube was purged with argon before starting the hydrogen sulfide. The furnace was then heated to temperature and H$_2$S allowed to continually flow throughout the reaction time. At the end of the reaction, the tube was again purged with inert gas and cooled. FIG. 2 is an X-ray diffraction pattern of the product produced in this Comparative Example. As shown in FIG. 2, the reaction produced FeS$_2$ as shown by the peaks at 43°, 50°, 56°, 62°, 73°, 89°, 94°, 99°, and 104°. The X-ray diffraction, however, shows that the process from this example also produced FeS as evidenced by the peaks at 45°, 51.5°, 68°, 84°, and 91.5°.

Example 1

Sulfidation Process

Synthetic FeS$_2$ is prepared using a sulfidation process in accordance with the present invention as follows: 2.6 grams of nanorust (nano particles of Fe$_2$O$_3$) from Alfa Aesar having an average particle size of about 3 nm and 0.5 grams of elemental sulfur from Alfa Aesar having a particle size of about 1-2 μm are charged to a flask as part of a Labconco rotary evaporator. The system is purged with argon before the introduction of H$_2$S is started. The flask is heated to the desired temperature using an oil bath. Hydrogen sulfide gas (about 6% volume percent in N$_2$) is flowed into the system. The hydrogen sulfide flow may be started before heating or after the oil bath had reached the desired temperature (125-200° C.). After the appropriate exposure time of hydrogen sulfide, about 5-6 hours for the solid masses listed above, the flask was raised out of the oil bath and the head pressure bled off and switched over to argon. When the flask and contents were cool, it was capped and quickly transferred to a drybox.

Figure 3:
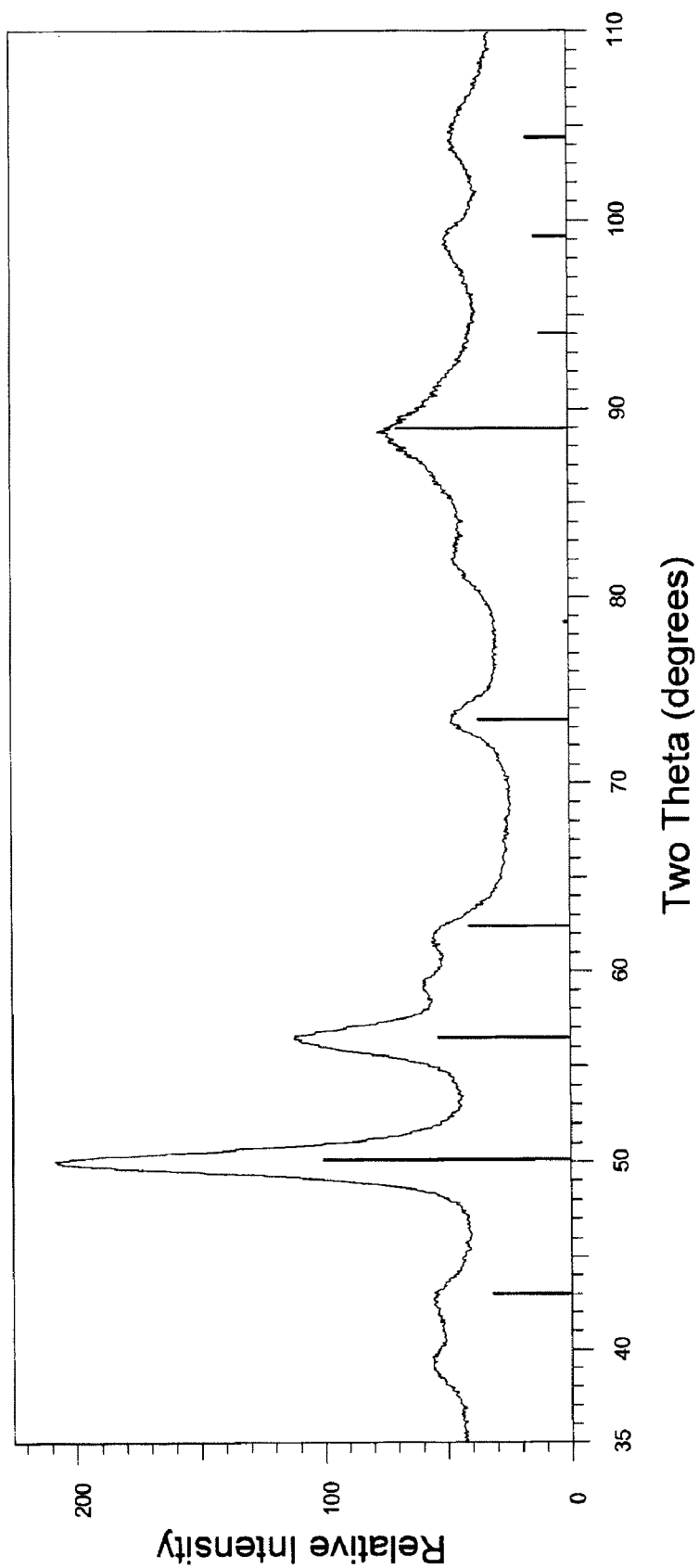
FIG. 3 is a XRD pattern of synthetic $FeS_2$ produced by a sulfidation process in accordance with the present invention.

FIG. 3 is an X-ray diffraction pattern of the synthetic FeS$_2$ prepared in accordance with Example 1. As shown in FIG. 3, the product from a sulfidation process in accordance with the present invention provides FeS$_2$ having a pyrite crystal phase, as evidenced by the peaks at 43°, 50°, 56°, 62°, 73°, 89°, 94°, 99°, and 104° using Cr radiation. FIG. 3 also shows the presence of some marcasite crystals in the FeS$_2$ product as evidenced by the peaks at 39°, 59°, and 81°. Pyrite and marcasite share a peak at 50°. As shown in FIG. 3, the product does not contain any FeS.

Figure 4:
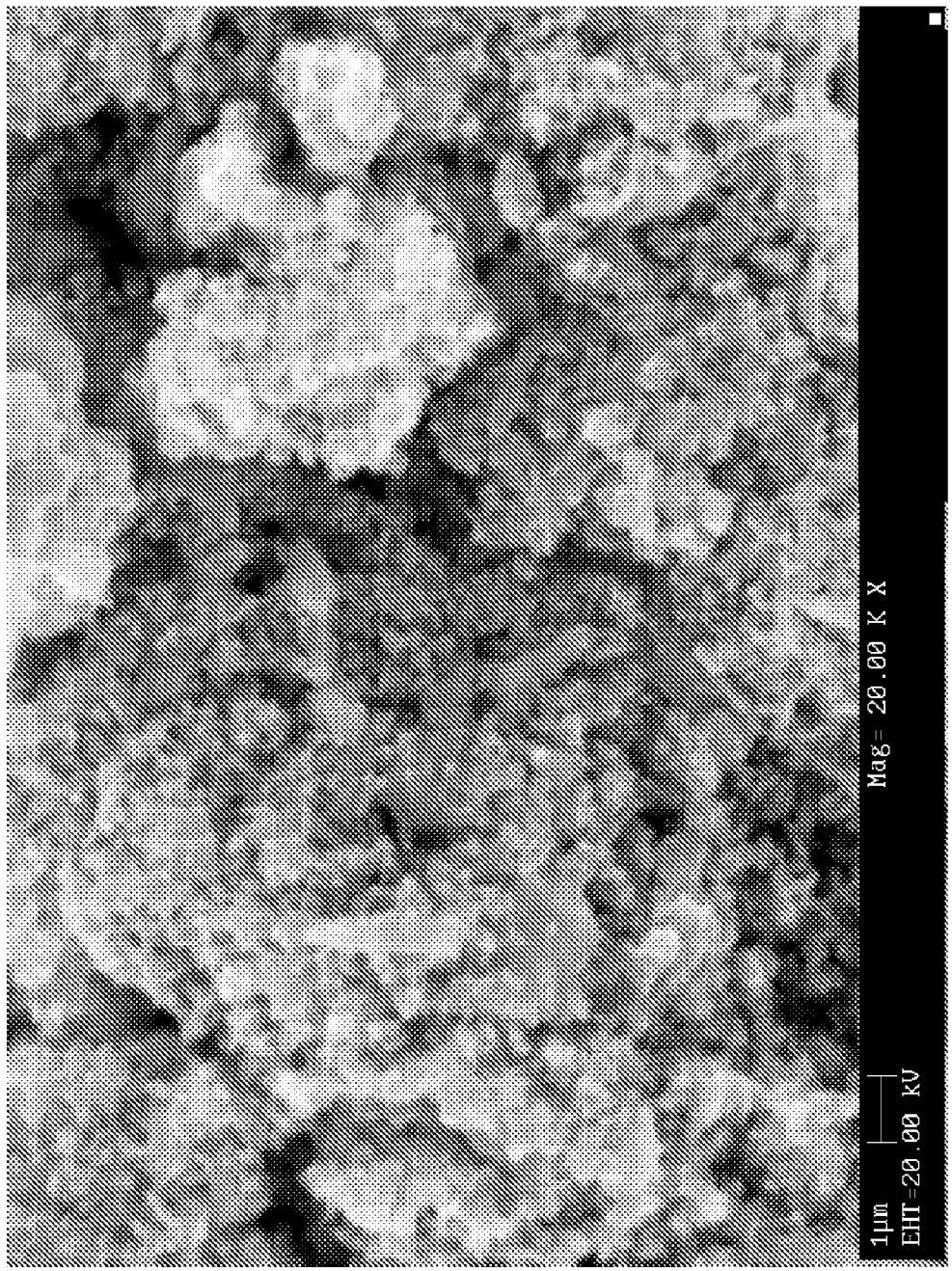
FIG. 4 illustrates a SEM micrograph at 20,000 times magnification of synthetic $FeS_2$ particles produced utilizing a sulfidation process in accordance with the present invention.
Figure 5:
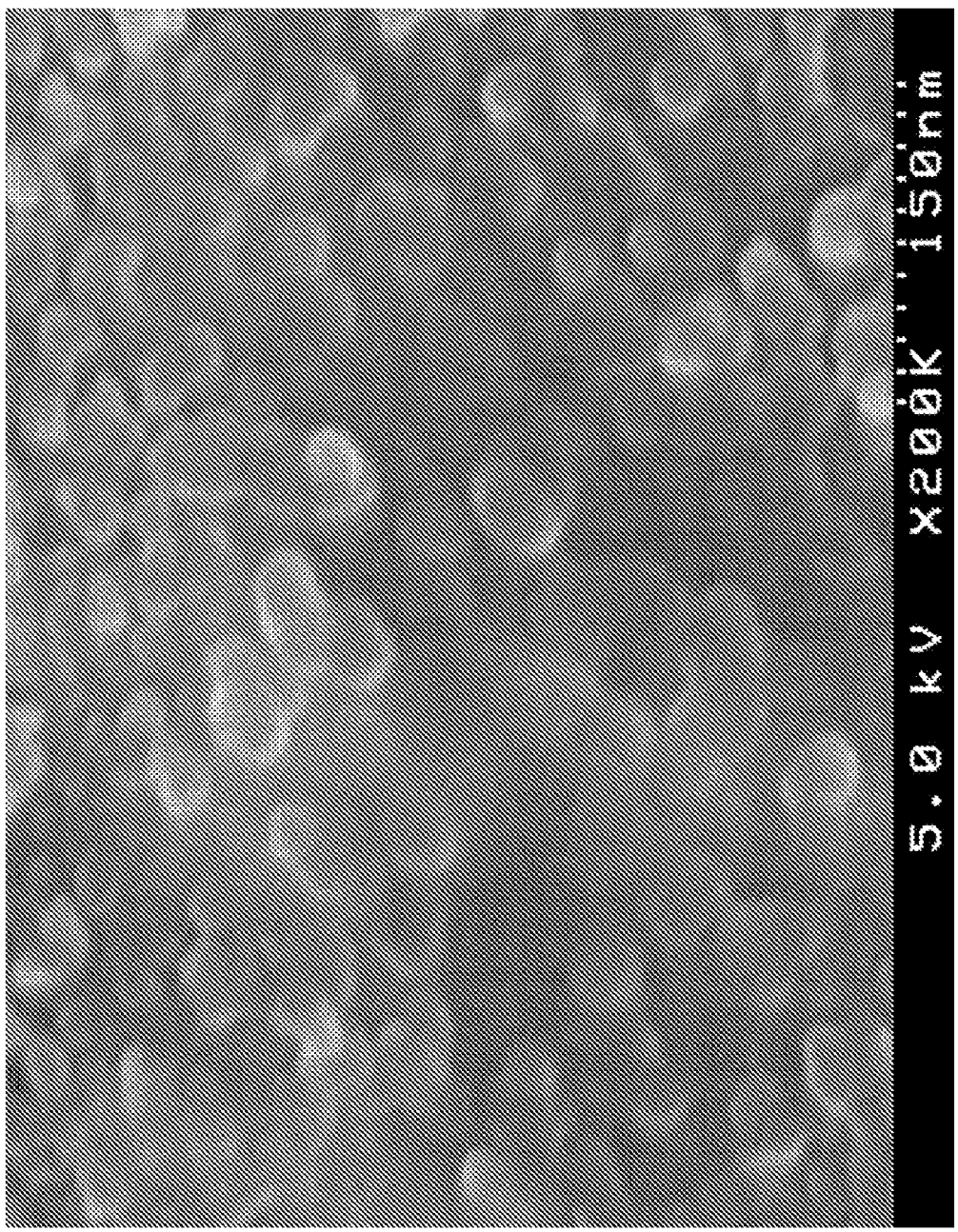
FIG. 5 illustrates a field emission SEM micrograph at 200,000 times magnification of synthetic $FeS_2$ particles produced utilizing a sulfidation process in accordance with the present invention.

FIG. 4 is a moderate magnification SEM image of synthetic FeS$_2$ prepared in accordance with Example 1. As shown in FIG. 4, the particles appear to have a particle size in the range of from about 30 to about 60 nm. FIG. 5 is a field emission SEM (FESEM) image of FeS$_2$ prepared in accordance with Example 1. As shown in FIG. 5, in some instances, the particles appear to be formed by an agglomeration of several crystallites having a crystallite size of about 10 nm to about 15 nm.

The physical properties of the synthetic FeS$_2$ and the natural FeS$_2$ are compared in Table 1. The average BET surface area of the FeS$_2$ particles in this Example is about 105 m$^2$/g.

TABLE 1

| Property | Synthetic FeS$_2$ (Example 1) | Natural FeS$_2$ |
| --- | --- | --- |
| Particle Size (nm) | 30-60 | 19,000 |
| Crystallite Size (nm) | 10 | — |
| BET Surface Area (m$^2$/g) | 105 | 0.7 |
| Neutron Activation (% Oxygen) | 0.93 | 1.54 |
| Number of Trace Metals >1000 ppm | 0 | 11 (Al, As, Ca, Co, Cu, K, Mg, Mn, Pb, Si, Zn) |

Example 2

Sulfidation Process

Figure 6:
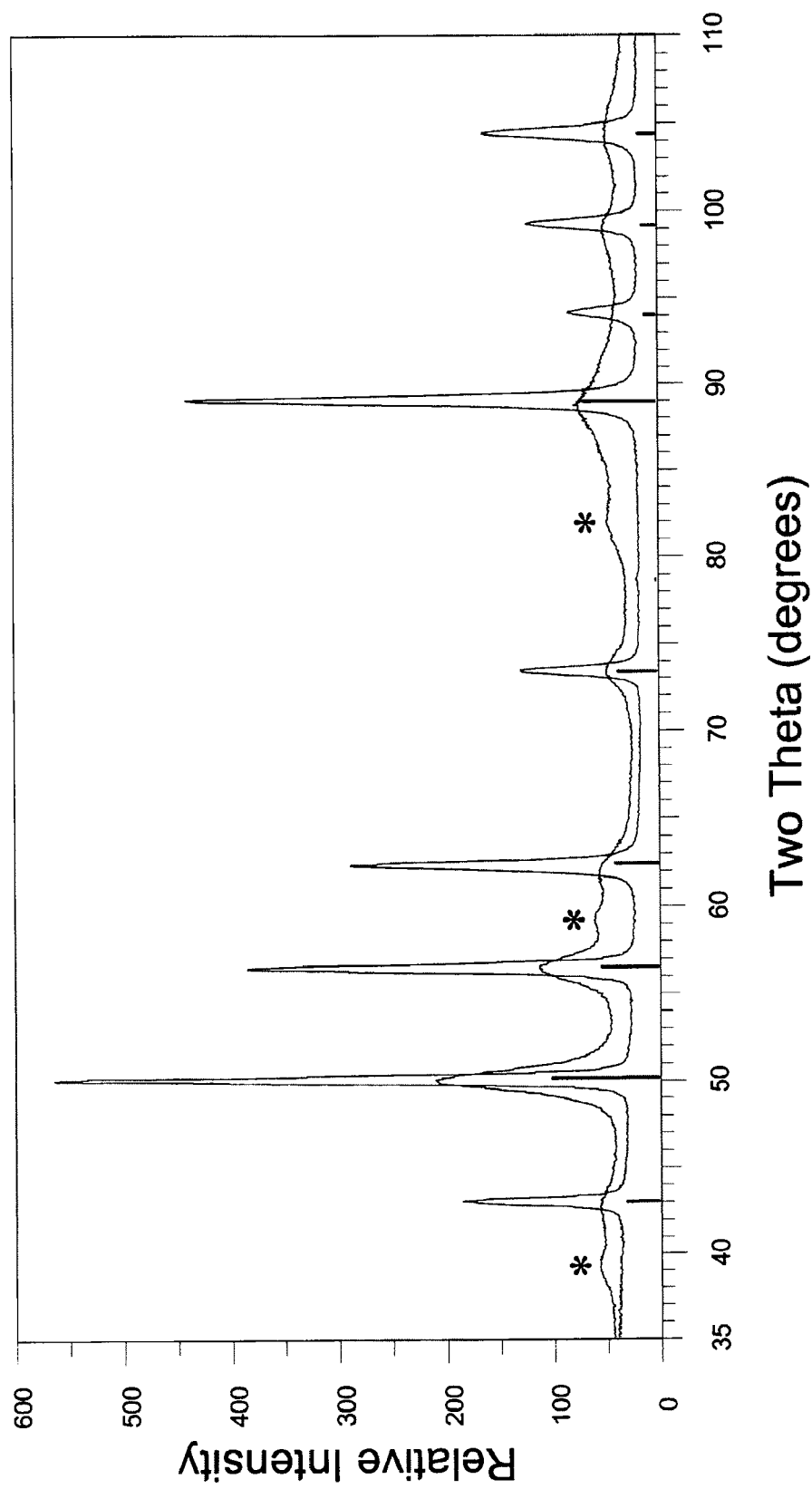
FIG. 6 is a XRD pattern of synthetic $FeS_2$ prepared by a sulfidation process in accordance with the present invention in which the $FeS_2$ particles are sintered.

Synthetic FeS$_2$ of Example 1 is sintered at 462° C. for two hours. Sintering causes the FeS$_2$ particles to grow and produce FeS$_2$ particles having a particle size of about 150 nm and a crystallite size of about 73 mn. FIG. 6 illustrates the X-ray diffraction pattern of the sintered FeS$_2$. In FIG. 6, the X-ray diffraction pattern of the FeS$_2$ from Example 1 (see FIG. 3) is superimposed over the X-ray diffraction pattern of the sintered FeS$_2$. The sintered FeS$_2$ sample is represented by the pattern having the sharper, more intense peaks. In FIG. 6, the asterisk symbols by the peaks at 30°, 59°, and 81° in the pattern for the FeS$_2$ product of Example 1 indicate the presence of marcasite in the unsintered product. As shown in FIG. 6, the sintered FeS$_2$ does not exhibit any peaks attributable to marcasite crystals. Thus, the marcasite crystals appear to have been converted to pyrite crystals.

Figure 7:
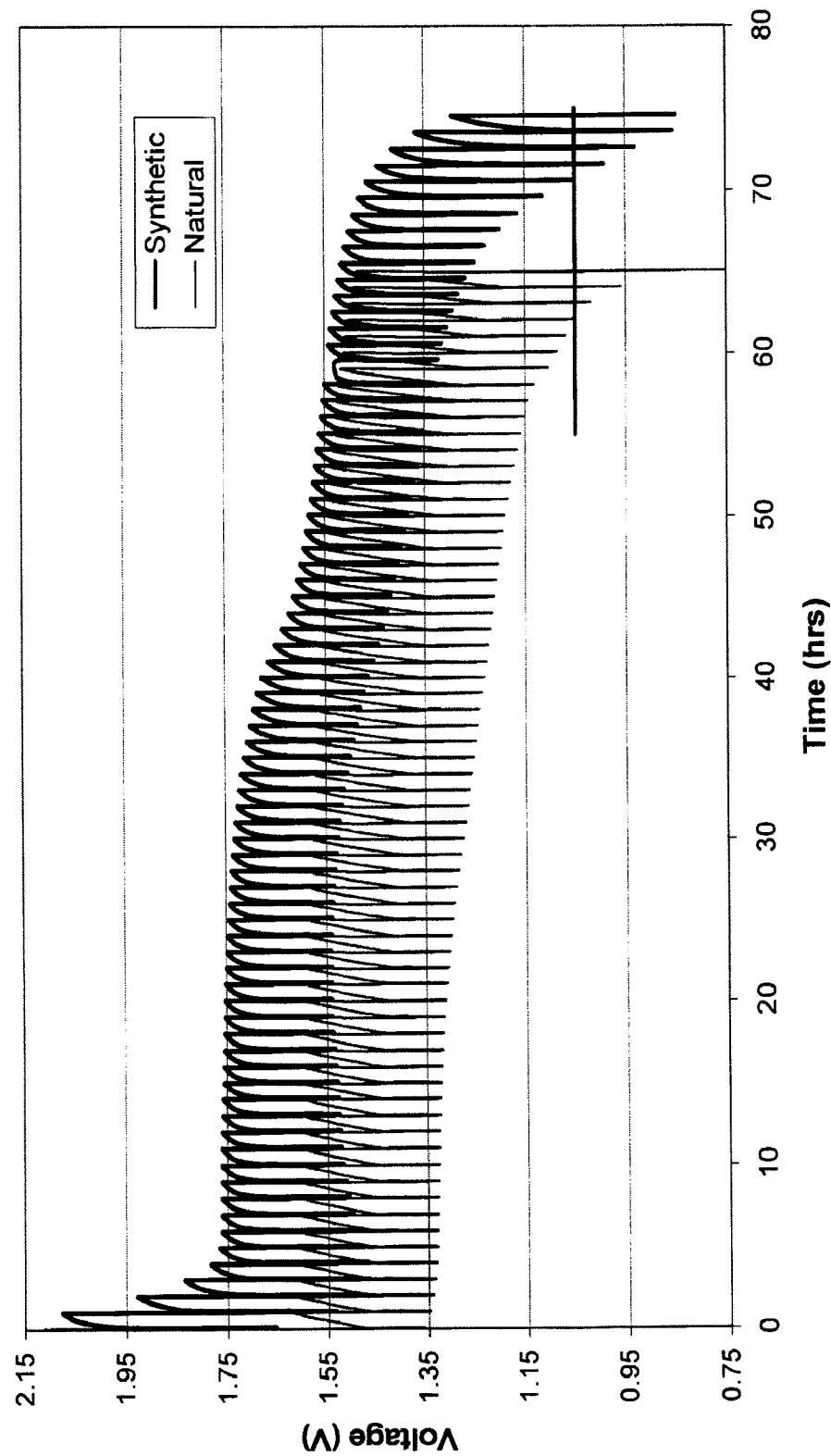
FIG. 7 is a voltage discharge profile comparing the voltage discharge characteristics of natural pyrite to the voltage discharge characteristics of synthetic $FeS_2$ prepared utilizing a sulfidation process in accordance with the present invention.

Electrical performance of the synthetic FeS$_2$ prepared in Example 2 is analyzed using the ANSI digital still camera (DSC) test method. The test is run, at room temperature, as follows. In a test vehicle scaled down relative to a full AA cell and containing a scaled amount of FeS$_2$ as active material, 1.5 W is applied for 2 seconds followed by 0.65 W for 28 seconds. This cycle is repeated nine more times. The cell is then allowed to recover under no load for 55 minutes before the whole process is repeated. This nested loop is repeated to some low voltage. The total minutes under load to a 1.05V cutoff are reported. The amount of active $FeS_2$ in the cell is about 18-20 mg for tests evaluating natural pyrite, and about 7-10 mg for tests evaluating the synthetic $FeS_2$. FIG. 7 shows the voltage discharge characteristics of a natural $FeS_2$ sample employed in typical Energizer factory product and synthetic $FeS_2$ from Example 2. As shown in FIG. 7, the difference between the 55 minute rest OCV and the high power result is around 300 mV for slightly more than half the test time (around 40 hours) and then gradually increases to 400 mV by the cut voltage of 1.05V. In the cells using the synthetic $FeS_2$ prepared in accordance with Example 2, the polarization is in the low 200 mV range for most of the test but doesn't begin to increase until a test time around 60 hours and doesn't increase to a final polarization of 400 mV until around 70 hours. The synthetic $FeS_2$ of Example 1 has an average voltage on rest of about 1.75V for about half the test, while the natural $FeS_2$ averaged around 1.55V. FIG. 7 also shows that the synthetic $FeS_2$ of Example 2 mimics the known two plateau discharge seen at low constant current rates and/or at elevated temperatures.

Figure 8:
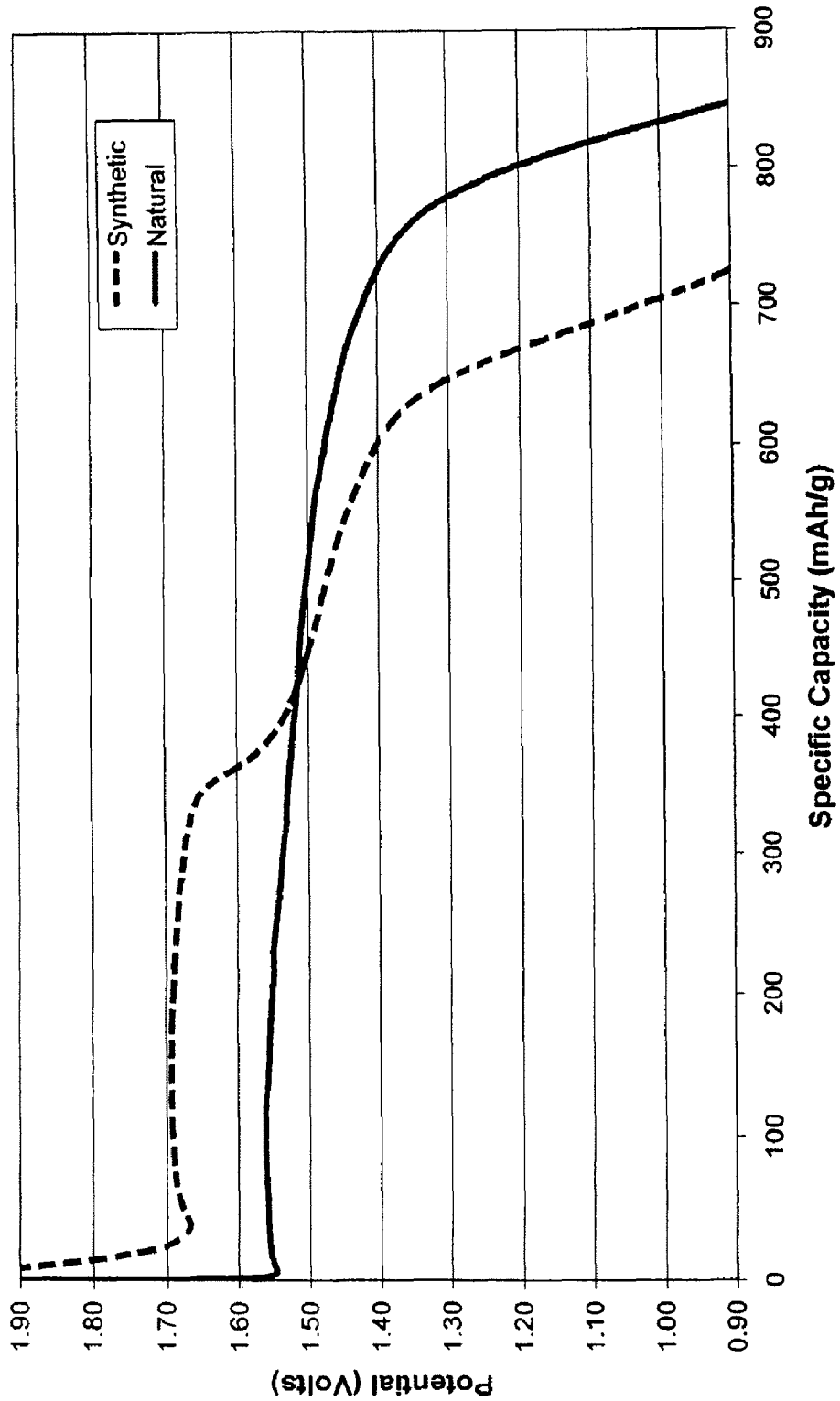
FIG. 8 is a discharge profile comparing the specific discharge capacity, at different currents, of natural pyrite and synthetic $FeS_2$ prepared by a sulfidation process in accordance with the present invention.
Figure 9:
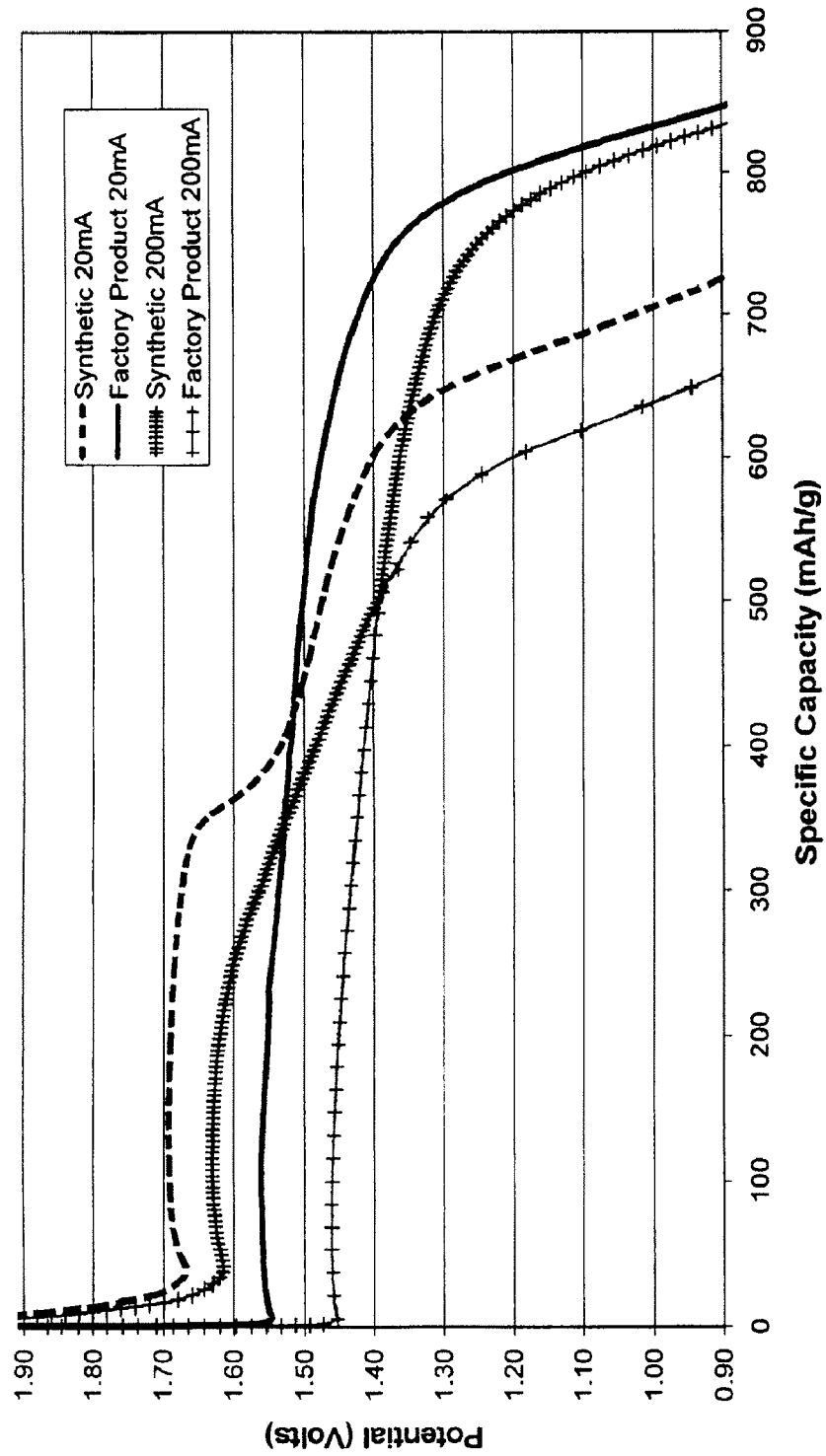
FIG. 9 is a discharge profile comprising $Li/FeS_2$ cells using natural $FeS_2$ or synthetic $FeS_2$ prepared by a sulfidation process in accordance with the present invention, with the cells being discharged under current densities of 20 mA/g and 200 mA/g.

FIG. 8 compares the discharge profile of natural $FeS_2$ and the synthetic $FeS_2$ of Example 2 at 20 mA constant current, and FIG. 9 includes discharge profiles at 20 mA and 200 mA constant current. As shown in FIGS. 8 and 9, at room temperature, the synthetic $FeS_2$ of Example 1 exhibits a two plateau discharge at low power (20 mA) and also appears to exhibit a two plateau discharge at 200 mA.

Figure 10:
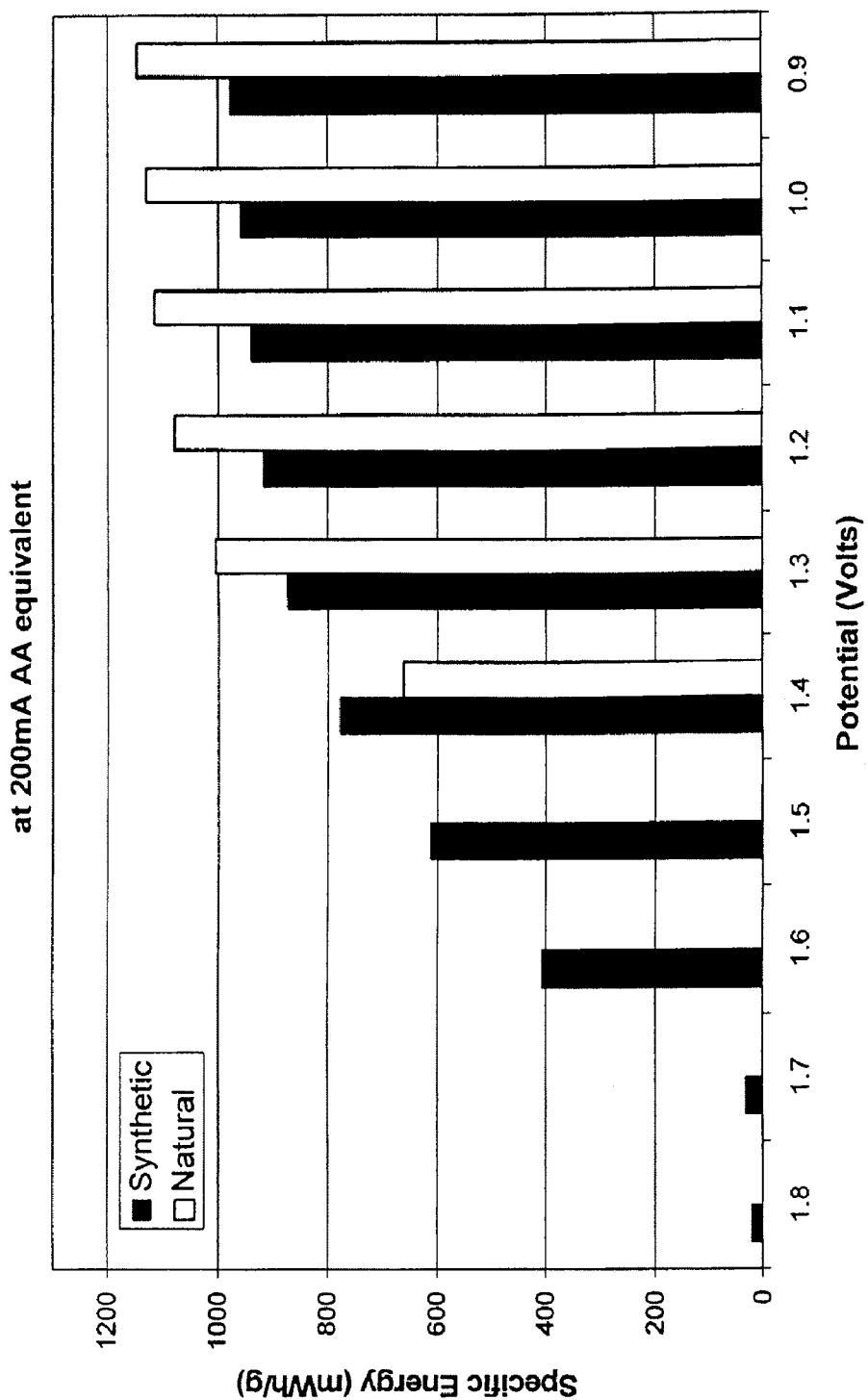
FIG. 10 is a graph comparing the specific energy density of natural $FeS_2$ to the synthetic $FeS_2$ from Example 2.

Specific energy density results are derived from the discharge data obtained at 200 mA. FIG. 10 compares the specific energy density values of the natural $FeS_2$ and the synthetic $FeS_2$ of Example 2. As shown in FIG. 10, only the synthetic $FeS_2$ of Example 2 has a significant energy density above 1.4V.

Example 3

Sulfidation Process

Synthetic $FeS_2$ obtained from the process of Example 1 is sintered at 700° C. for 2 days under vacuum at a pressure of about $10^{-7}$ torr to provide synthetic $FeS_2$ particles having an average particle size of about 1 to about 2 μm.

Example 4

Sulfidation Process

Synthetic $FeS_2$ is prepared by a sulfidation process as described in Example 1 except that the reaction is carried out at temperature of about 200° C. The $FeS_2$ in this Example has an average particle size in the range of from about 100 to about 150 nm.

Example 5

Milling Process

Synthetic $FeS_2$ is prepared by a milling process as follows: Sulfur powder and iron powder are charged to a SPEX vial in about a 2:1 molar ratio of sulfur to iron. The total amount of iron and sulfur powder is about 13 grams. Carbon steel balls, which are used as the milling media, are also charged to the vial. The total weight of the milling media is about 89 grams. 13 grams of hexane, which is utilized as the process control agent, is charged to the vial under an argon atmosphere. The powders are mechanical milled for about five hours to provide a powder mixture. After milling, the vial is opened in a glove box (inert Ar atmosphere) and the hexane is allowed to evaporate.

After the hexane evaporates, the powder mixture is vacuum encapsulated in quartz and annealed to form $FeS_2$. The powder mixture is annealed by heating at a temperature of 450° C.; the mixture is heated by increasing the temperature 2° C. per minute up to 450° C. and holding the temperature at 450° C. for forty-five minutes to form $FeS_2$.

Figure 11:
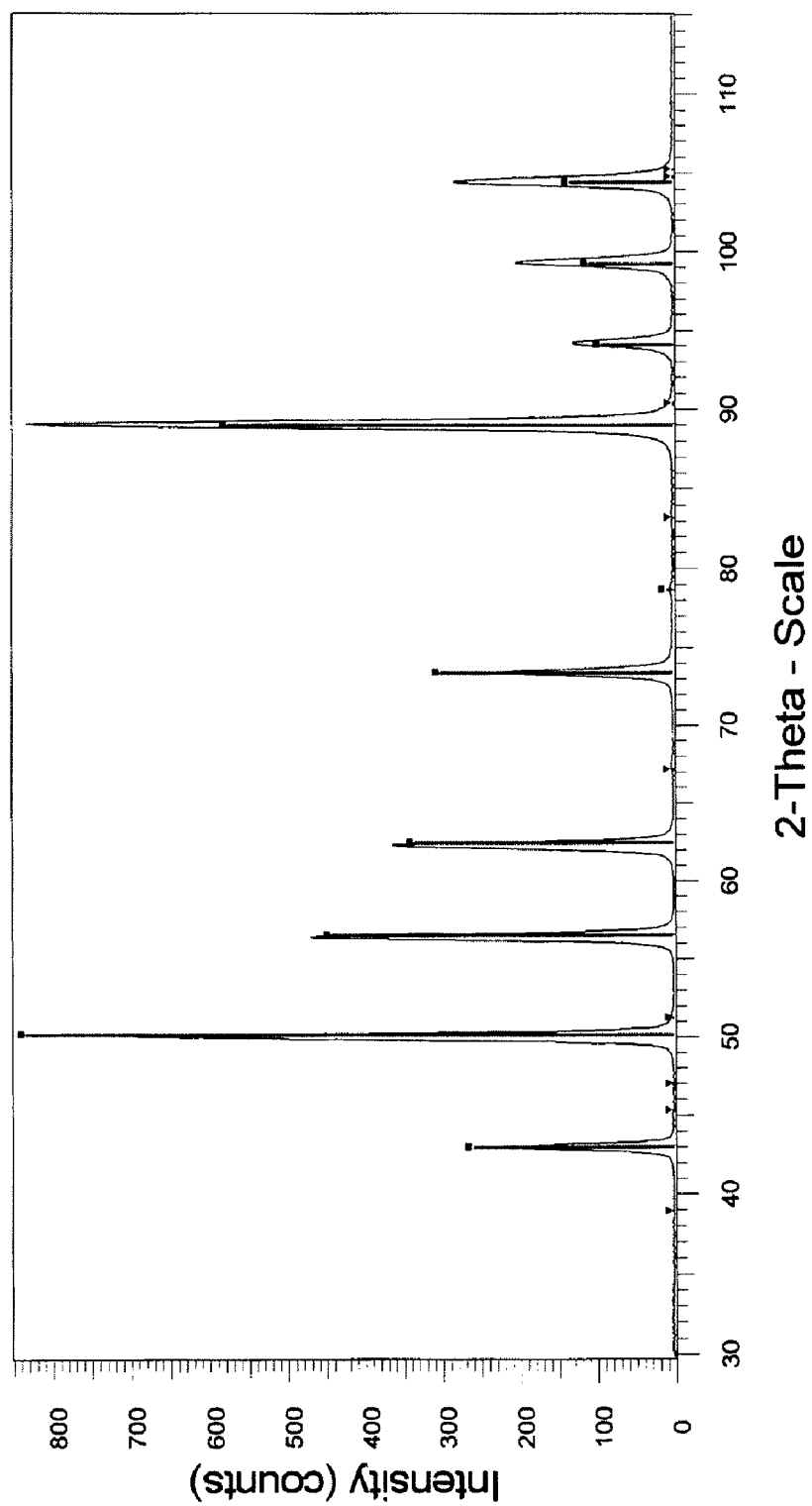
FIG. 11 is a XRD pattern of synthetic $FeS_2$ prepared by a milling process in accordance with the present invention.

FIG. 11 is an X-ray diffraction pattern of the product formed in this Example. As shown in FIG. 11, the product is $FeS_2$ having a pyrite crystal phase, as evidenced by the peaks at 43°, 50°, 56°, 62°, 73°, 89°, 94°, 99°, and 104°. The X-ray diffraction pattern also shows a small peak at 68°, which may be attributed to some FeS in the product. Such an impurity may be due to a small excess of iron in the system from the steel milling media.

Figure 12:
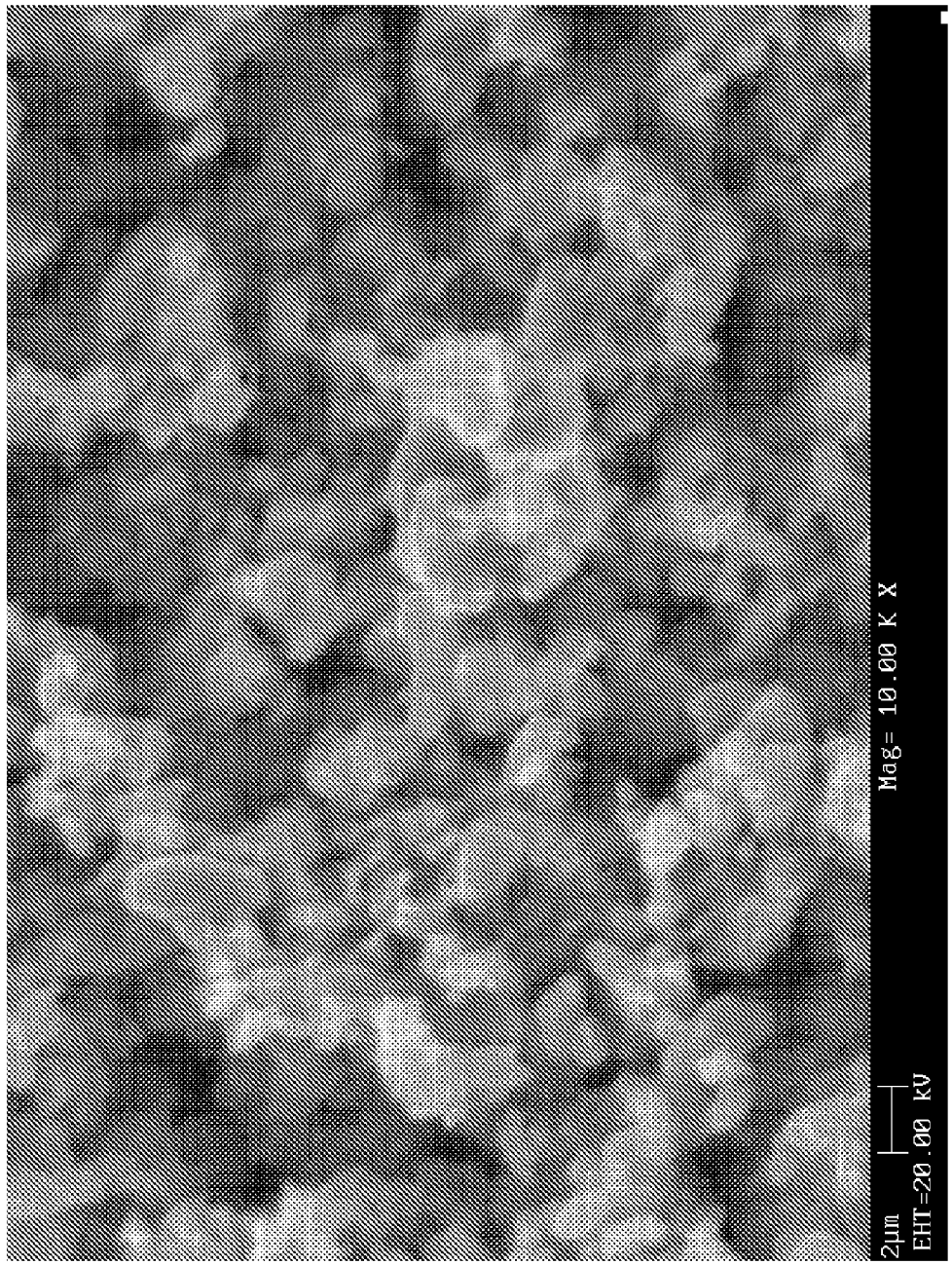
FIG. 12 is a SEM image of $FeS_2$ particles produced by a milling process in accordance with the present invention.

FIG. 12 is a SEM image of the particles produced in accordance with this Example. The particles have an average particle size of about 2-3 μm and a crystallite size of about 160 nm.

Figure 13:
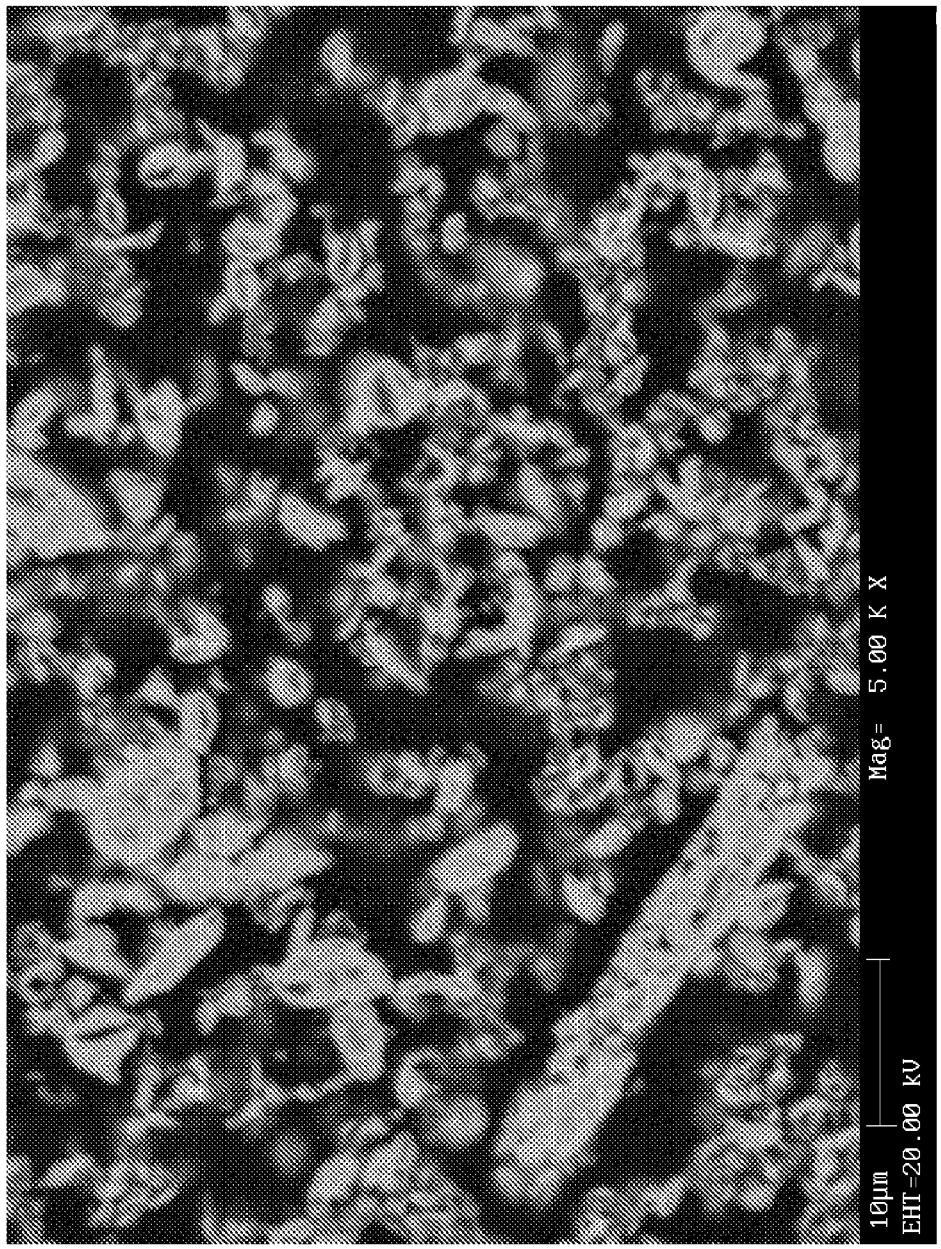
FIG. 13 is a SEM image of a cross section of $FeS_2$ particle produced by a milling process in accordance with the present invention.

FIG. 13 is a SEM image of a cross-section of $FeS_2$ particles produced in accordance with this Example. FIG. 13 shows that the particles possess some void volume and, therefore, exhibit some porosity. The $FeS_2$ of this Example has a BET surface area of about 2.7 $m^2/g$. the $FeS_2$ also has a carbon content of about 0.15% by weight of the $FeS_2$.

Example 6

Sulfidation Process

Synthetic $FeS_2$ is prepared using a sulfidation process as follows: 17.5 grams of nanorust (nano particles of $Fe_2O_3$) from Alfa Aesar having an average particle size of about 3 nm and 3.5 grams of elemental sulfur from Alfa Aesar having a particle size of about 1-2 μm are charged to a flask. The system is purged with argon before the introduction of $H_2S$ is started. The flask is heated using an oil bath. A flow of hydrogen sulfide gas (about 40 volume percent $H_2S$ in $N_2$) is started at the same time as the heating of the oil bath. The reaction is allowed to proceed for about an hour at 125° C. before ramping up to the final desired temperature (e.g., about 200° C.). After the appropriate exposure time of hydrogen sulfide, about 5 hours for the solid masses listed above, the flask is raised out of the oil bath and the head pressure is bled off and switched over to argon. When the flask and contents are cool, it is capped and transferred to a drybox.

X-ray diffraction of the product material showed peaks consistent with $FeS_2$ pyrite (~43°, 50°, 56°, 62°, 73°, 89°, 94°, 99°, and 104° using Cr radiation) and $FeS_2$ marcasite (~39°, 50°, and 59°).

While the present invention has been described herein with reference to various exemplary embodiments thereof, the invention is not intended to be limited to such embodiments. Further, upon reading and understanding the present application, modifications and changes may occur to those skilled in the art without departing from the spirit of the disclosed technology. It is intended that the disclosed technology be considered as including all such modifications and changes.

The invention claimed is:
1. A method of producing synthetic $FeS_2$ comprising:
reacting $Fe_2O_3$, elemental sulfur, and hydrogen sulfide in an inert atmosphere, the reaction being conducted at a temperature of from about 125° C. to about 200° C. for a sufficient period of time to form synthetic $FeS_2$ particles.

2. The method according to claim 1, comprising (i) reacting the $Fe_2O_3$, elemental sulfur, and hydrogen sulfide at a temperature of about 125° C. for a selected period of time, and (ii) subsequently raising the temperature of the reaction to no greater than about 200° C.

3. The method according to claim 2, wherein the selected period of time is less than 5 hours.

4. The method according to claim 1, wherein the $Fe_2O_3$ has an average particle size of about 1 nm to about 100 nm.

5. The method according to claim 1, wherein the $Fe_2O_3$ has an average particle size of about 3 nm to about 10 nm.

6. The method according to claim 1, comprising applying a protective coating to the synthetic $FeS_2$.

7. The method according to claim 6, wherein the protective coating comprises a conductive material.

8. The method according to claim 7, wherein the conductive material comprises a carbon material, a metal material, a metal oxide, or an organic conductive material.

9. The method according to claim 6, wherein the protective coating is applied by spray pyrolysis.

10. The method according to claim 1, wherein the $FeS_2$ particles have a particle size of from about 5 to about 600 nm.

11. The method according to claim 1, wherein the $FeS_2$ has an average particle size of about 250 nm or less.

12. The method according to claim 1, wherein the $FeS_2$ has an average particle size of about 200 nm or less.

13. The method according to claim 1, wherein the $FeS_2$ has a crystallite size of from about 5 to about 100 nm.

14. The method according to claim 1, wherein the $Fe_2O_3$, elemental sulfur and hydrogen sulfide are provided in about a 1:3:0.125 molar ratio of $Fe_2O_3$:hydrogen sulfide:elemental sulfur when the elemental sulfur is provided as $S_8$.

15. The method according to claim 1, comprising sintering the $FeS_2$ particles at a temperature of about 400° C. to about 700° C. so that the $FeS_2$ consists essentially of pyrite.

16. The method according to claim 15, wherein, after sintering, the $FeS_2$ has a crystallite size of from about 35 nm to about 3 μm.

17. The method according to claim 1, wherein the hydrogen sulfide is a gas comprising from about 6% by volume to about 99% by volume of hydrogen sulfide in a carrier gas.

18. The method according to claim 1, wherein the synthetic $FeS_2$ particles comprise less than 1% by weight of metal impurities.

19. The method according to claim 1, wherein the synthetic $FeS_2$ particles comprise less than 3% by weight of oxide impurities.

20. The method according to claim 1, wherein the synthetic $FeS_2$ particles contain less than 3% by weight of iron sulfide impurities.

21. The method according to claim 1, wherein the synthetic $FeS_2$ particles contain less than 1% by weight of iron sulfide impurities.

22. The method according to claim 1, wherein the synthetic $FeS_2$ particles contain less than 0.1% by weight of iron sulfide impurities.

23. The method according to claim 1, wherein the synthetic $FeS_2$ particles contain less than 0.01% by weight of iron sulfide impurities.

* * * * *